United States Patent
Chosack et al.

(10) Patent No.: US 6,939,138 B2
(45) Date of Patent: Sep. 6, 2005

(54) ENDOSCOPIC TUTORIAL SYSTEM FOR UROLOGY

(75) Inventors: Edna Chosack, Orange, OH (US); David Barkay, Kiryat Ono (IL); Ran Bronstein, Modi'in (IL); Ran Cohen, Petach Tikva (IL)

(73) Assignee: Simbionix Ltd., Lod (IL)

(*) Notice: Subject to any disclaimer, the term of this patent is extended or adjusted under 35 U.S.C. 154(b) by 65 days.

(21) Appl. No.: 10/239,881

(22) PCT Filed: Apr. 5, 2001

(86) PCT No.: PCT/IL01/00323
§ 371 (c)(1),
(2), (4) Date: Oct. 7, 2002

(87) PCT Pub. No.: WO01/78039
PCT Pub. Date: Oct. 18, 2001

(65) Prior Publication Data
US 2003/0091967 A1 May 15, 2003

Related U.S. Application Data
(60) Provisional application No. 60/196,288, filed on Apr. 12, 2000.

(51) Int. Cl.[7] .................................... G09B 23/28
(52) U.S. Cl. ........................................... 434/262
(58) Field of Search ............................... 434/262

(56) References Cited
U.S. PATENT DOCUMENTS

| | | | | |
|---|---|---|---|---|
| 4,907,973 A | * | 3/1990 | Hon | 434/262 |
| 5,620,326 A | * | 4/1997 | Younker | 434/268 |
| 5,769,640 A | * | 6/1998 | Jacobus et al. | 434/262 |
| 5,800,179 A | * | 9/1998 | Bailey | 434/262 |
| 5,882,206 A | * | 3/1999 | Gillio | 434/262 |
| 5,891,030 A | * | 4/1999 | Johnson et al. | 600/407 |
| 6,106,301 A | * | 8/2000 | Merril | 434/262 |
| 6,126,450 A | * | 10/2000 | Mukai et al. | 434/262 |
| 6,283,763 B1 | * | 9/2001 | Matsuzaki et al. | 434/262 |
| 2004/0076940 A1 | * | 4/2004 | Alexander et al. | 434/262 |

* cited by examiner

Primary Examiner—Chanda L. Harris
(74) Attorney, Agent, or Firm—G.E. Ehrlich (1995) Ltd.

(57) ABSTRACT

A method and a system for simulating the minimally invasive medical procedure of urological endoscopy. The system is designed to simulate the actual medical procedure of urological endoscopy as closely as possible by providing both a simulated medical instrument, and tactile and visual feedback as the simulated procedure is performed on the simulated patient. Particularly preferred features include a multi-path solution for virtual navigation in a complex anatomy, the simulation of the effect of the beating heart on the urethra as it crosses the illiac vessel, and the simulated operation of a guidewire within the urethra In addition, the system and method optionally and more preferably incorporate the effect of dynamic contrast injection of dye into the urethra for fluoroscopy. The injection of such dye, and the subsequent visualization of the urological organ system in the presence of the endoscope, must be accurately simulated in terms of accurate visual feedback. Thus, the system and method provide a complete solution to the complex and difficult problem of training students in urological endoscopy procedures.

20 Claims, 12 Drawing Sheets

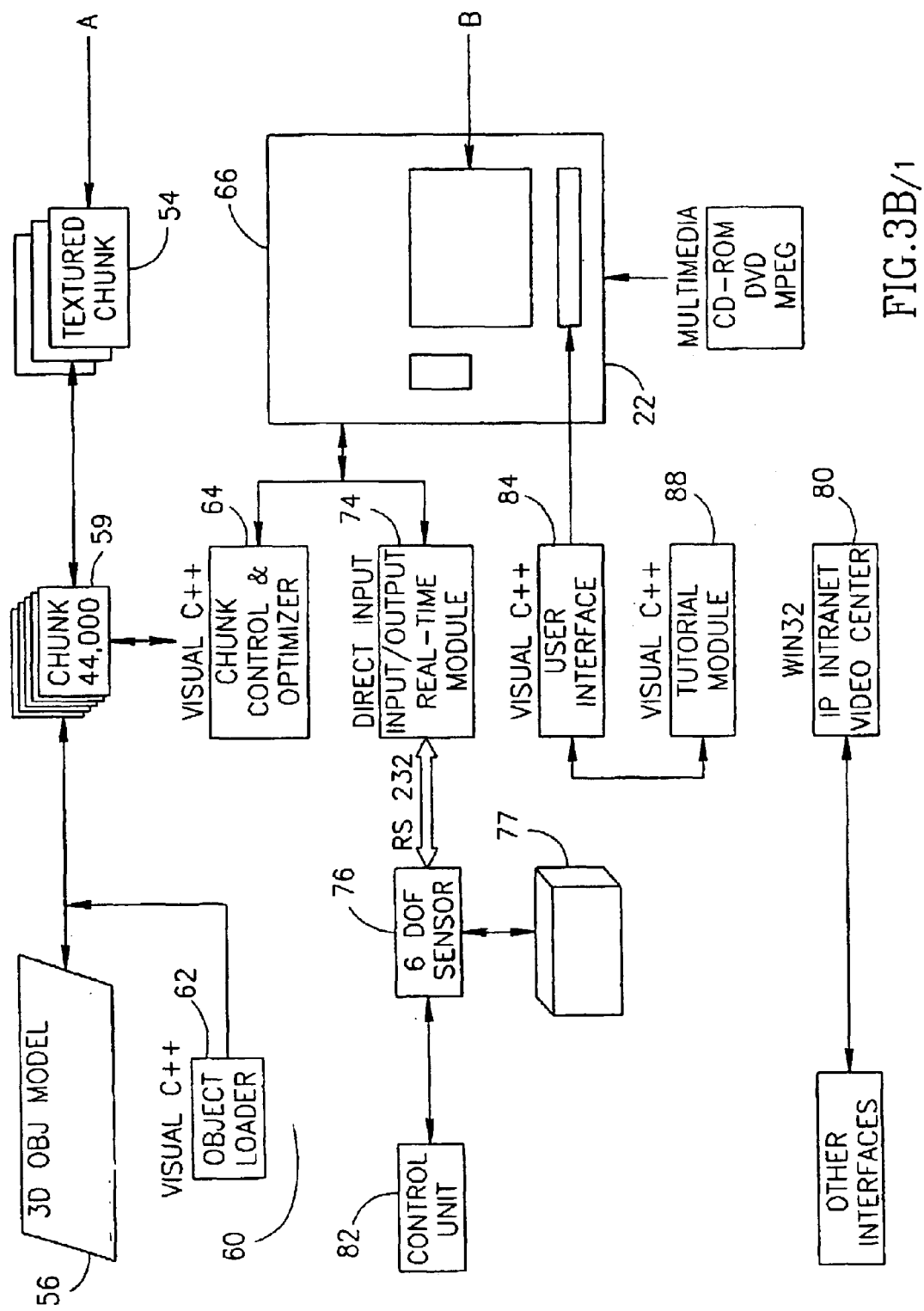

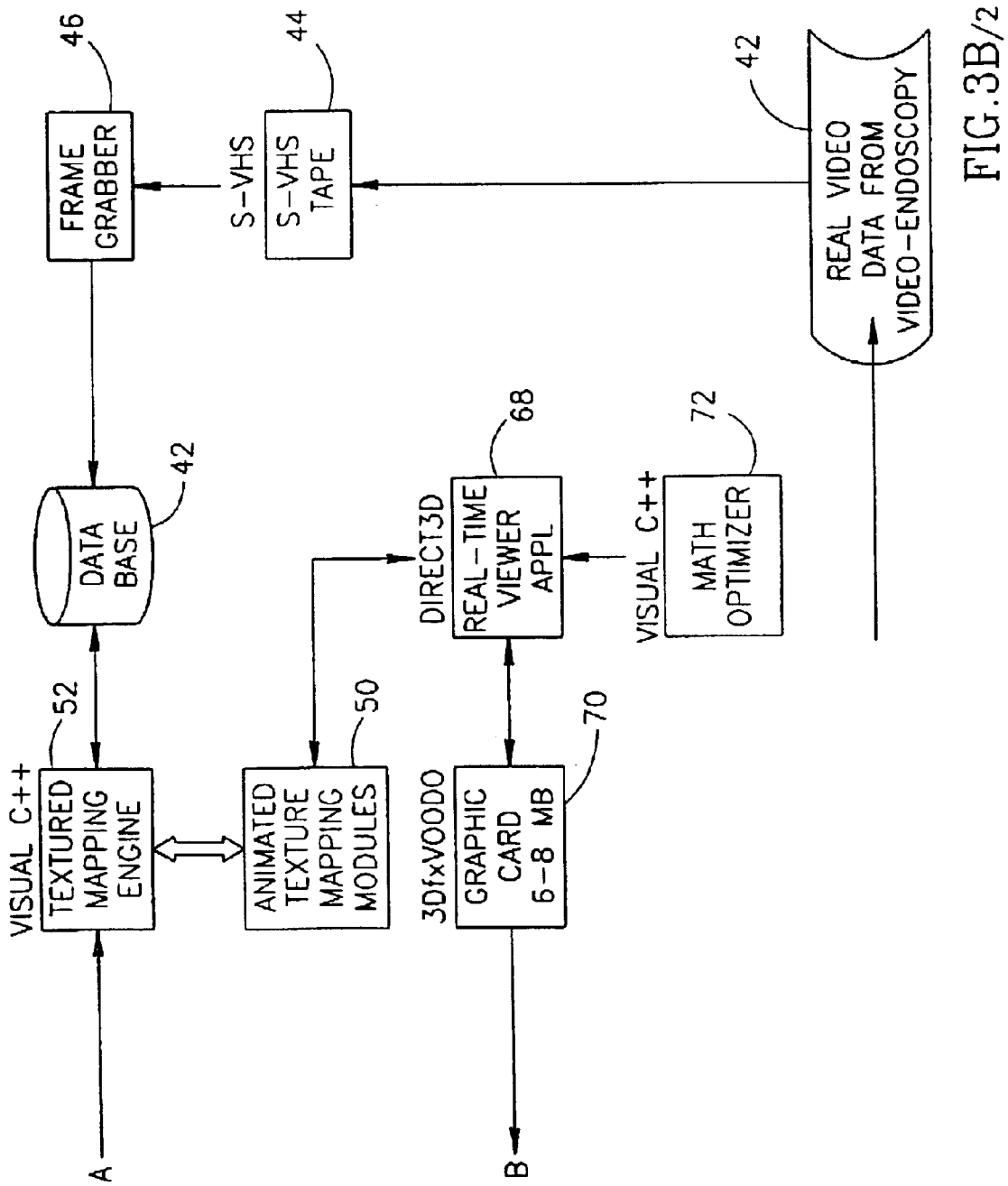
FIG.3B/2

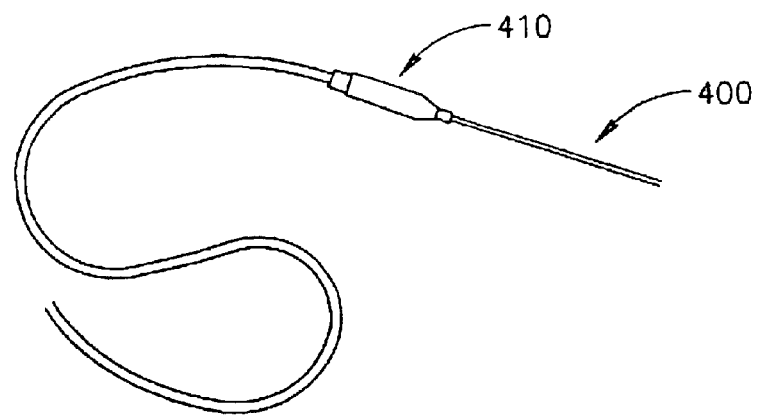
FIG. 9
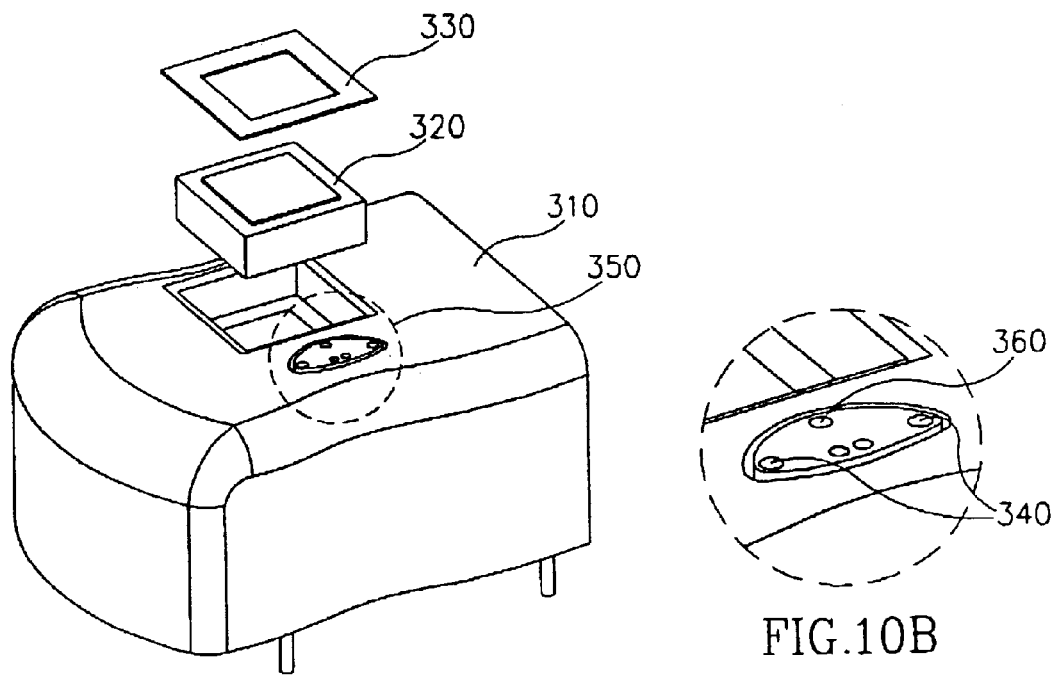
FIG. 10A
FIG. 10B

ENDOSCOPIC TUTORIAL SYSTEM FOR UROLOGY

RELATED PATENT APPLICATIONS

This application is a National Phase Entry of PCT/IL01/00323 filed 5 Apr. 2001, which claims benefit from U.S. Provisional Patent Application Ser. No. 60/196,288 filed 12 Apr. 2000.

FIELD AND BACKGROUND OF THE INVENTION

The present invention relates to a system and method for teaching and training students in medical procedures, and in particular to a system and method for training students in the procedure of endoscopy for urology.

Endoscopy is an example of a minimally invasive medical procedure, which can be performed on a number of different organ systems, such as the gastrointestinal tract and the urethra. Flexible gastro-endoscopy is an important medical tool for both surgical and diagnostic procedures in the urological organ system. Essentially, gastro-endoscopy is performed by inserting an endoscope, which is a flexible tube, into the gastrointestinal system, either through the mouth or the rectum of the subject. The tube is manipulated by a trained physician through specialized controls. The end of the tube which is inserted into the subject contains a camera and one or more surgical tools, such as a clipper for removing tissue samples from the gastrointestinal system. The physician must maneuver the tube according to images of the gastrointestinal system received from the camera and displayed on a video screen. The lack of direct visual feedback from the gastrointestinal system is one factor which renders endoscopy a complex and difficult procedure to master. Such lack of feedback also increases the difficulty of hand-eye coordination and correct manipulation of the endoscopic device. Thus, flexible gastro-endoscopy is a difficult procedure to both perform and to learn.

Currently, students are taught to perform flexible gastro-endoscopy according to the traditional model for medical education, in which students observe and assist more experienced physicians. Unfortunately, such observation alone cannot provide the necessary training for such complicated medical procedures. Students may also perform procedures on animals and human cadavers, neither of which replicates the visual and tactile sensations of a live human patient. Thus, traditional medical training is not adequate for modern technologically complex medical procedures.

In an attempt to provide more realistic medical training for such procedures, simulation devices have been developed which attempt to replicate the tactile sensations and/or visual feedback for these procedures, in order to provide improved medical training without endangering human patients. An example of such a simulation device is disclosed in U.S. Pat. No. 5,403,191, in which the disclosed device is a box containing simulated human organs. Various surgical laparoscopic procedures can be performed on the simulated organs. Visual feedback is provided by a system of mirrors. However, the system of both visual and tactile feedback is primitive in this device, and does not provide a true representation of the visual and tactile sensations which would accompany such surgical procedures in a human patient. Furthermore, the box itself is not a realistic representation of the three-dimensional structure of a human patient. Thus, the disclosed device is lacking in many important aspects and fails to meet the needs of a medical simulation device.

Attempts to provide a more realistic experience from a medical simulation devices are disclosed in PCT Patent Application Nos. WO 96/16389 and WO 95/02233. Both of these applications disclose a device for providing a simulation of the surgical procedure of laparoscopy. Both devices include a mannequin in the shape of a human torso, with various points at which simulated surgical instruments are placed. However, the devices are limited in that the positions of the simulated surgical instruments are predetermined, which is not a realistic scenario. Furthermore, the visual feedback is based upon a stream of video images taken from actual surgical procedures. However, such simple rendering of video images would result in inaccurate or unrealistic images as portions of the video data would need to be removed for greater processing speed. Alternatively, the video processing would consume such massive amounts of computational time and resources that the entire system would fail to respond in a realistic time period to the actions of the student. At the very minimum, a dedicated graphics workstation would be required, rather than a personal computer (PC). Thus, neither reference teaches or discloses adequate visual processing for real time visual feedback of the simulated medical procedure.

Similarly, U.S. Pat. No. 4,907,973 discloses a device for simulating the medical procedure of flexible gastro-endoscopy. The disclosed device also suffers from the deficiencies of the above-referenced prior art devices, in that the visual feedback system is based upon rendering of video data taken from actual endoscopic procedures. As noted previously, displaying such data would either require massive computational resources, or else would simply require too much time for a realistic visual feedback response. Thus, the disclosed device also suffers from the deficiencies of the prior art.

A more useful and efficient medical simulation device for minimally invasive therapeutic procedures such as endoscopy is disclosed in PCT Application No. WO 99/38141. The disclosed medical simulation device provides real time, accurate and realistic visual feedback of general endoscopic procedures, as well as realistic tactile feedback, so that the visual and tactile systems are accurately linked for the simulation as for an actual medical procedure.

Another type of endoscopic procedure, for urology, would also benefit from such realistic simulation, involving both visual and tactile feedback which are provided in an accurate manner. Urological endoscopic procedures feature many of the same principles as gastro-endoscopy, since for both types of endoscopic procedures, an instrument is inserted into a body orifice, and must then be guided through a tubular organ without direct visual feedback. In addition, the physician performing the procedure must be able to correctly interpret both the indirect visual feedback provided through a video monitor, as well as the tactile feedback through the instrument itself. Therefore, both types of endoscopy require the physician to receive "hands-on" manual training for the correct performance of the procedure.

In addition, urological endoscopy has other features which differ from gastro-endoscopy. For example, before the endoscope can be introduced into the ureteral opening, a guidewire must be inserted into the ureter and moved up to the kidney. If the guidewire is inserted too quickly and/or with too much force, the tip of the guidewire may penetrate the bladder wall or even the kidney. Therefore, the operation of the guidewire as well as of the endoscope itself must be modeled. Also, the endoscope may be maneuvered through one of three paths for urological endoscopy, as opposed to a single path for gastro-endoscopy: one path for each kidney, and a third path through the urethra to the top of the bladder. Furthermore, along this path the ureter crosses the illiac vessel such that the ureter in that area actually moves according to the rate of the beating heart. Such movement must also be modeled for an accurate simulation of the urological procedure. Finally, urological endoscopy may also involve the optional procedure of contrast dye injection into the urological system. Thus, although urological endoscopy shares many features with gastro-endoscopy, the former procedure must be separately simulated for accurate training and simulation.

There is therefore a need for, and it would be useful to have, a method and a system to simulate urological endoscopy, which would provide accurate, linked visual and tactile feedback to the student and which would serve as a training resource for all aspects of the procedure.

SUMMARY OF THE INVENTION

The present invention includes a method and a system to simulate the minimally invasive medical procedure of urological endoscopy. The system is designed to simulate the actual medical procedure of urological endoscopy as closely as possible by providing both a simulated medical instrument, and tactile and visual feedback as the simulated procedure is performed on the simulated patient. Particularly preferred features of the present invention are the provision of a multi-path solution for virtual navigation in a complex anatomy, the simulation of the effect of the beating heart on the ureter as it crosses the illiac vessel, and the simulated operation of a guidewire within the urinary tract.

Other optional but preferred features include, but are not limited to lithotripter devices for breaking stones in the kidneys and throughout the urological organ system, including but not limited to, laser, Lithoclast, EHL (Electro-Hydraulic), and Ultrasound; tools for stone extraction, including but not limited to the following tools: various baskets and forceps; biopsy forceps; electrodes for cutting tissue and coagulation of any resultant bleeding; stents and catheters for drainage; and balloons for opening strictures.

In addition, the present invention optionally and more preferably includes the effect of dynamic contrast injection of dye into the upper urinary tract for fluoroscopy. The injection of such dye, and the subsequent visualization of the urological organ system in the presence of the endoscope, must be accurately simulated in terms of accurate visual feedback. Thus, the present invention provides a complete solution to the complex and difficult problem of training students in urological endoscopy procedures.

According to the present invention, there is provided a system for performing a simulated medical urological endoscopy procedure, comprising: (a) at least a portion of a simulated urological organ system, (b) a simulated endoscope for performing the simulated medical urological endoscopy procedure on the at least a portion of the simulated urological organ system; (c) a locator for determining a location of the simulated endoscope within the simulated at least a portion of a simulated urological organ system; and (d) a visual display for displaying images according to the location of the simulated endoscope within the simulated at least a portion of a simulated urological organ system for providing visual feedback, such that the images simulate actual visual data received during an actual medical procedure as performed on an actual subject.

According to another embodiment of the present invention, there is provided a method for performing a simulated endoscopic procedure on a simulated urological organ system, comprising the steps of: (a) providing a system for performing the simulated endoscopic procedure; (b) inserting the simulated endoscope into the simulated urological organ system; (c) receiving visual feedback according to the displayed image; and (d) receiving tactile feedback according to the location of the endoscope within the urological organ system.

The method of the present invention for preparing a model of the simulated organ, and for rendering the visual feedback of the simulated organ during the simulated medical procedure, can be described as a plurality of instructions being performed by a data processor. As such, these instructions can be implemented in hardware, software or firmware, or a combination thereof As software, the steps of the method of the present invention could be implemented in substantially any suitable programming language which could easily be selected by one of ordinary skill in the art, including but not limited to, C and C++.

Hereinafter, the term "simulated medical procedure" refers to the simulation of the medical procedure as performed through the system and method of the present invention. Hereinafter, the term "actual medical procedure" refers to the performance of the medical procedure on an actual, living human patient with an actual endoscope, such that the medical procedure is "real" rather than "simulated". Hereinafter, the term "corresponding actual organ" refers to the "real" organ of a human being or other mammal which is being simulated by the simulated organ of the present invention.

Hereinafter, the term "endoscopy" includes, but is not limited to, the procedure of urological endoscopy, as previously described, and medical diagnostic and surgical procedures in which an endoscope is inserted into the urethra of the subject for manipulation within the urological organ system of the subject. Hereinafter, the term "urological organ system" refers to the urethra, bladder, the ureters and the kidneys, or any portion thereof Hereinafter, the term "subject" refers to the human or lower mammal upon which the method and system of the present invention are performed or operated. Hereinafter, the term "student" refers to any human using the system of the present invention, being trained according to the present invention or being taught according to the present invention including, but not limited to, students attending medical school or a university, a medical doctor, a trained urologist or other trained medical specialist.

BRIEF DESCRIPTION OF THE DRAWINGS

The foregoing and other objects, aspects and advantages will be better understood from the following detailed description of a preferred embodiment of the invention with reference to the drawings, wherein:

FIG. 3A is a flowchart of an exemplary method according to the present invention for preparation of the visual model of the simulated organ and rendering of visual feedback and FIG. 3B is a schematic block diagram of an exemplary visual processing and display system according to the present invention;

FIG. 9 shows an exemplary puncturing needle and tracking sensor for use with the present invention;

FIG. 10 shows a puncture area overall according to the present invention (FIG. 10A) with a portion shown in greater detail (FIG. 10B);

BRIEF DESCRIPTION OF THE INVENTION

Figure 1:
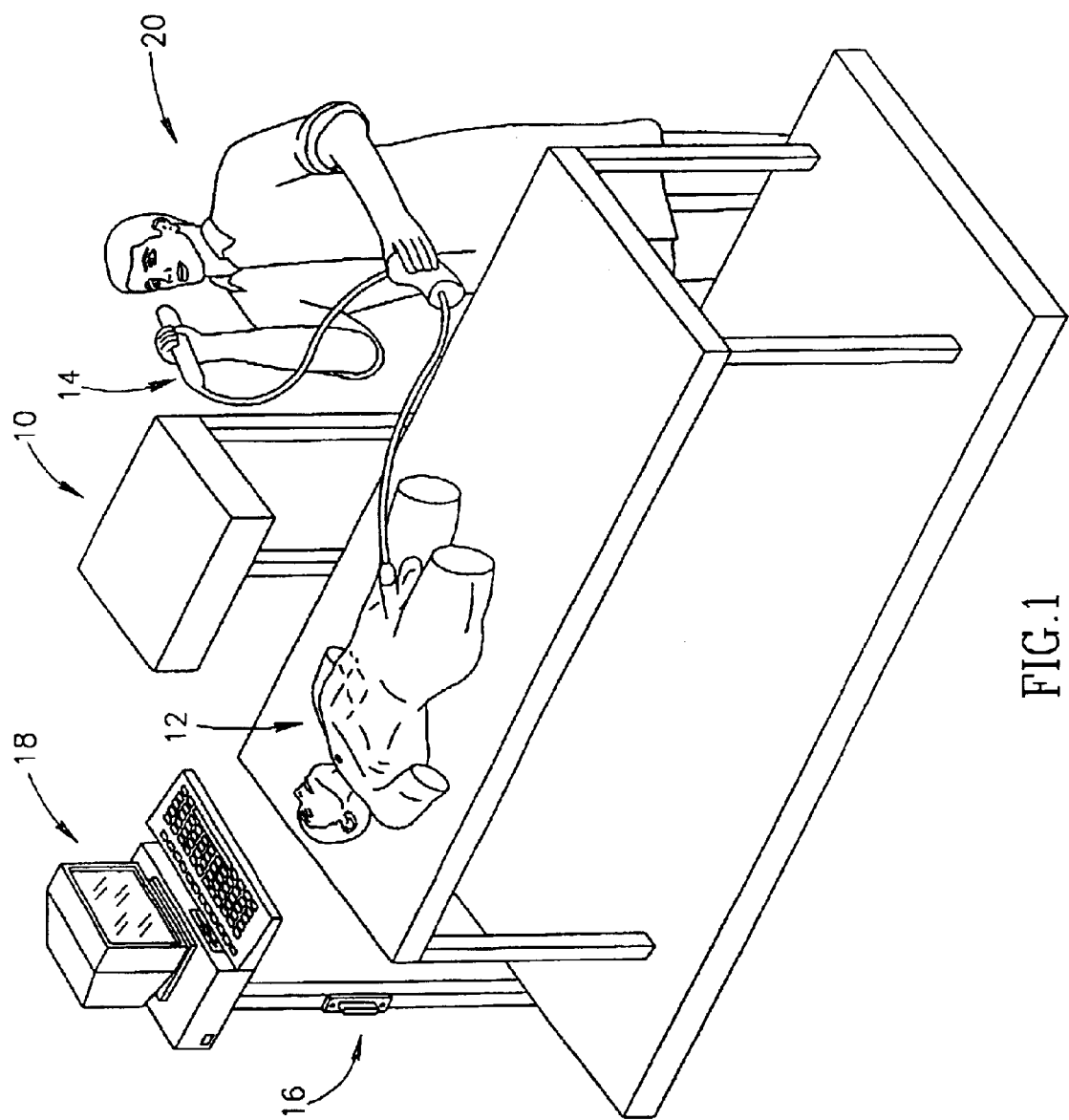
FIG. 1. is an exemplary illustration of the system for simulation of urological endoscopy according to the present invention.

The present invention includes a method and a system to simulate the medical procedure of urological endoscopy, or flexible endoscopy in the urological organ system. The system is designed to simulate the actual medical procedure of urological endoscopy as closely as possible by providing both a simulated medical instrument, and tactile and visual feedback as the simulated procedure is performed on the simulated patient. Although the discussion is directed toward the medical procedure of urological endoscopy, the present invention could also be employed to simulate other types of minimally invasive medical procedures performed on the urological organ system.

The system of the present invention features both a physical model and a virtual model for the simulation of the medical procedure of urological endoscopy. The physical model includes a mannequin with a simulated ureteral opening into which the simulated endoscope is inserted, after a simulated guidewire has been inserted, thereby accurately reflecting the performance of the actual urological endoscopic procedure. A simulated urological organ system is located within the mannequin. The simulated urological organ system includes a tactile feedback system for providing realistic tactile feedback according to the movement of the simulated endoscope within the simulated organ.

The virtual model provides a "virtual reality" for the simulation of images from the endoscope. In an actual endoscopic medical procedure, a camera at the tip of the actual endoscope returns images from the urological organ system of the human patient. These images are then viewed by the physician performing the endoscopic procedure, thereby providing visual feedback to the physician. The system of the present invention provides a "virtual reality" for the realistic simulation of this visual feedback. This virtual reality enables the real-time display of realistic images of the urological organ system on a video monitor according to the manipulations of the simulated endoscope, preferably in such a manner that the tactile and visual feedback are linked as they would be in a human patient.

The virtual reality has two main components: a three-dimensional, mathematical model of the urological organ system, or a portion thereof, and a database of enhanced digitized images derived from actual visual data obtained from actual endoscopic procedures. The mathematical model of the urological organ system is further complicated by the requirement for a multi-path solution, as the simulation optionally involves the simulation of up to three different paths for the endoscope and guidewire: either ureter up to the corresponding kidney, and the top of the bladder. The complex mathematical model and the enhanced digitized images are combined to provide realistic visual feedback by using the enhanced images as texture mapping to overlay the mathematical model of the simulated organ, thereby closely simulating images obtained from the actual procedure.

The virtual reality feedback of the urological organ system is particularly advantageous for simulating images because it does not rely on video streams, which require massive computational power for real-time display of visual feedback. In addition, video streams provide only a predetermined flow of images and cannot provide visual data with six degrees of freedom in real time. Furthermore, the virtual reality of the present invention does not rely merely on a mathematical model of the urological organ system, which cannot capture the irregularities and subtle visual features of actual urological lumen tissue from a human patient. Thus, the virtual reality feedback of the urological organ system in the present invention provides the best simulation of realistic images in real time for visual feedback.

DETAILED DESCRIPTION OF PREFERRED EMBODIMENTS

The present invention is related to a method and a system to simulate the procedure of urological endoscopy. The system is designed to simulate the actual medical procedure of urological endoscopy as closely as possible by providing both a simulated medical instrument, and tactile and visual feedback as the simulated procedure is performed on the simulated patient. Particularly preferred features of the present invention are the provision of a multi-path solution for virtual navigation in a complex anatomy, the simulation of the effect of the beating heart on the ureter as it crosses the illiac vessel, and the simulated operation of a guidewire within the urethra. In addition, the present invention optionally and more preferably includes the effect of dynamic contrast injection of dye into the urethra for fluoroscopy. The injection of such dye, and the subsequent visualization of the urological organ system in the presence of the endoscope, must be accurately simulated in terms of accurate visual feedback. Thus, the present invention provides a complete solution to the complex and difficult problem of training students in urological endoscopy procedures.

The system of the present invention includes a mannequin with a ureteral opening into which the simulated endoscope, with associated guidewire, is inserted. Visual feedback is provided through a video monitor, which displays realistic images in real time, according to the manipulations of the simulated endoscope. Realistic tactile feedback is also provided, preferably in such a manner that the tactile and visual feedback are linked as they would be in a human patient. Preferably, the present invention also features a tutorial system for training students and testing their performance. Thus, the system and method of the present invention provide a realistic simulation of the medical procedure of urological endoscopy for training and testing students.

The principles and operation of a method and a system according to the present invention for the simulation of the medical procedure of urological endoscopy, preferably including communicating tutorial results and measurement of student skills to the teacher or supervising medical personnel, may be better understood with reference to the drawings and the accompanying description, it being understood that these drawings are given for illustrative purposes only and are not meant to be limiting.

Referring now to the drawings, FIG. 1 depicts an exemplary, illustrative system for medical simulation according to the present invention. A system 10 includes a mannequin 12 representing the subject on which the procedure is to be performed, a simulated endoscope 14 and a computer 16 with a video monitor 18. A student 20 is shown interacting with system 10 by manipulating simulated endoscope 14 within mannequin 12. As further illustrated in FIGS. 5A and 5B below, mannequin 12 includes a simulated urological organ system into which simulated endoscope 14 is inserted (not shown). As student 20 manipulates simulated endoscope 14, tactile and visual feedback are determined according to the position of endoscope 14 within the simulated urological organ system. The visual feedback are provided in the form of a display on video monitor 18. The necessary data calculations are performed by computer 16, so that realistic tactile and visual feedback are provided to student 20.

Figure 2:
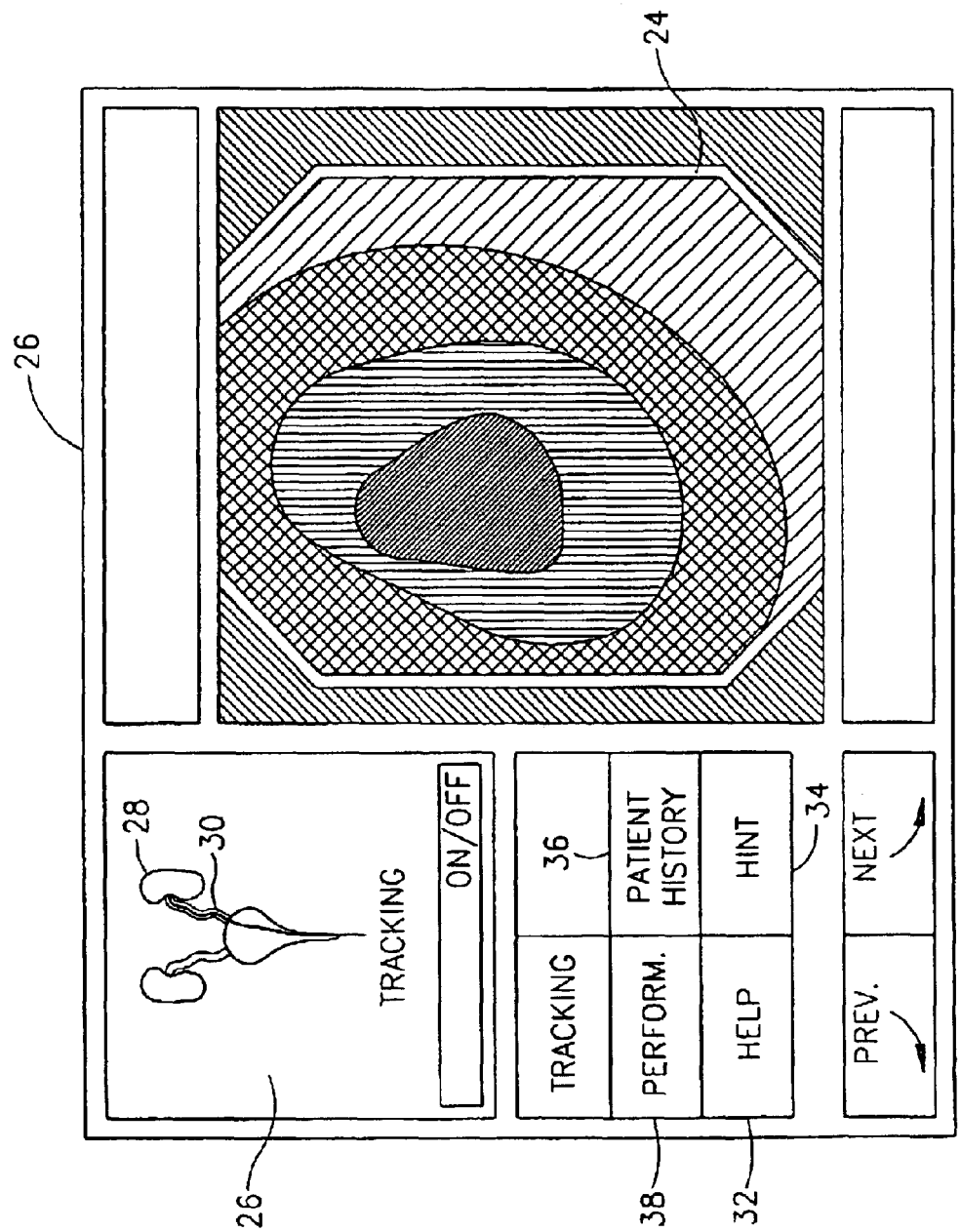
FIG. 2 is an exemplary illustration of a screen display according to the present invention.

FIG. 2 is an exemplary illustration of a screen display shown on monitor 18. A screen display 22 includes a feedback image 24. Feedback image 24 represents the visual image as seen if the endoscope were inserted into a living human patient. Feedback image 24 is an accurate and realistic simulation of the visual data that would be received from that portion of the urological organ system in the living human patient. Although feedback image 24 is shown as a static image, it is understood that this is for illustrative purposes only and the actual visual feedback data would be in the form of a substantially continuous flow of simulated images based upon actual video stream data obtained from an actual endoscopic procedure. Thus, the flow of images represented by feedback image 24 gives the student (not shown) realistic visual feedback.

In addition, screen display 22 preferably includes a number of GUI (graphic user interface) features related to the preferred tutorial functions of the present invention. For example, a tracking display 26 explicitly shows the location of the simulated endoscope within the simulated urological organ system. Tracking display 26 includes a schematic urological organ system 28, into which a schematic endoscope 30 has been inserted. Preferably, tracking display 26 can be enabled or disabled, so that the student can only see tracking display 26 if the tracking function is enabled.

Additional, optional but preferred features of screen display 22 include the provision of a "help" button 32, which upon activation could cause the display of such helpful information as a guide to the controls of the endoscope. Similarly, a preferred "hint" button 34 would give the student one or more suggestions on how to continue the performance of the medical procedure. A preferred "patient history" button 36 would cause screen display 22 to show information related to one of a selection of simulated "patient histories", which could be of help to the student in deciding upon a further action. Finally, a preferred "performance" button 38 would cause screen display 22 to display a review and rating of the performance of the student. All of these functions are part of the preferred embodiment of a tutorial system for training a student in the medical procedure of urological endoscopy, as described in further detail in FIG. 4.

Figure 3A:
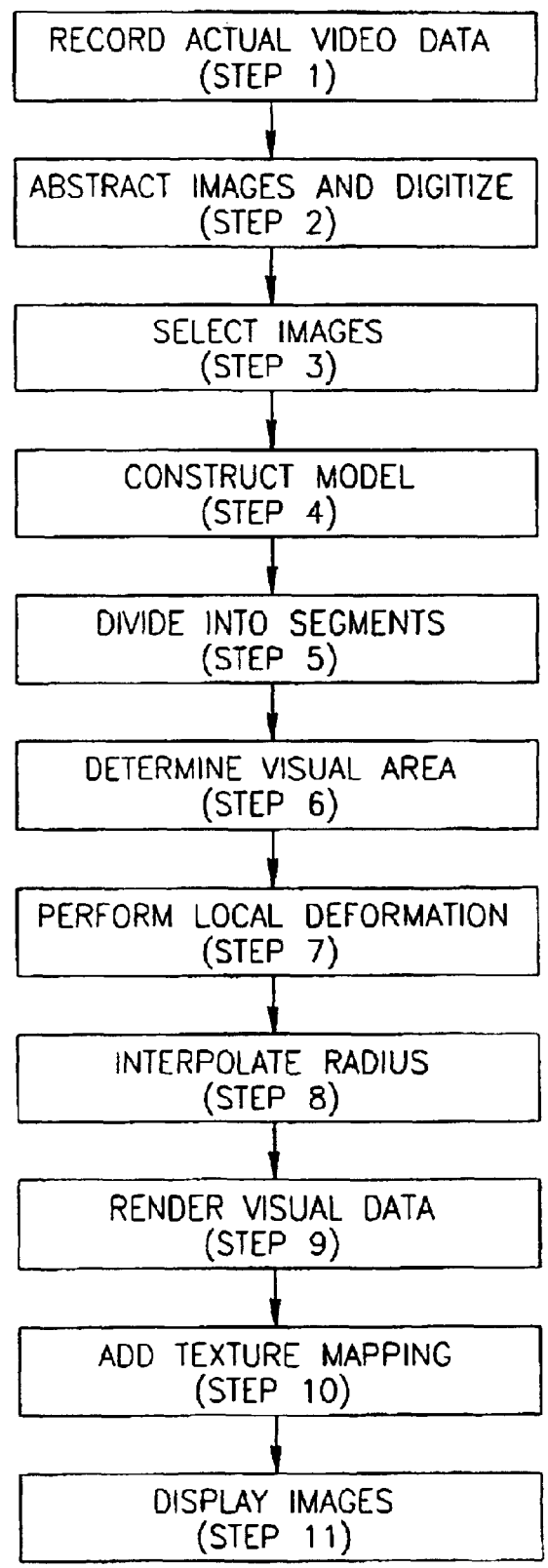

FIGS. 3A and 3B are schematic block diagrams of an exemplary visual processing and display system and method according to the present invention. FIG. 3A is a flow chart of the method for visual processing and display according to the present invention, and is intended as a summary of the method employed by the system of FIG. 3B. Further details concerning particular aspects of the method are described below with reference to FIG. 3B.

The method and system of the present invention provide a solution to a number of problems in the art of simulation of the procedure of urological endoscopy. This procedure involves the visual display of an interior portion of the urological organ system. The actual display depends upon the portion of the urological organ system which is being viewed. For example, the urethra is a relatively stiff tube, while each ureter is a flexible body with a curved structure. The bladder is a large open three-dimensional sac, while the kidney features a number of openings from the ureter. The inner surface of each of these organs is generally deformable, as well as being specifically, locally deformable. All of these deformations in space must be calculated according to the mathematical model of the particular portion of the urological organ system, and then rendered visually in real time in order to provide a realistic visual feedback response for the user.

FIG. 3A shows a preferred embodiment of the method of the present invention for preparation of the model and rendering of visual feedback, including steps required for preparation of the computerized model of the urological organ system, as well as steps required for display of the urological organ system. As described in greater detail with regard to FIG. 6 below, the procedures which are required for modeling the endoscope are also preferably performed with regard to the guidewire, which is inserted into the urological organ system before the endoscope, and which therefore is more preferably modeled and rendered separately from the endoscope itself.

In step 1 of the method of the present invention, actual video data are recorded onto videotape during the performance of the actual medical procedure of endoscopy on a living human patient. In addition, such data could also include MRI (magnetic resonance imaging) and CAT (computer assisted tomography) scan data, and/or fluoroscopy data from diagnostic radiology, from procedures performed on living human patients.

In step 2, individual images are abstracted, for example with a framegrabber device, and then digitized. In step 3, the digitized images are preferably selected for clarity and lack of visual artifacts, and are then stored in a texture mapping database. More preferably, the digitized images are enhanced before being stored. Most preferably, the texture mapping also include animation. Such animation could simulate effects such as vibration of the tissue of the urethra at the point where the ureter crosses the illiac vessel, as well as such events as urine and/or other biological fluids such as blood, flowing downward due to the influence of gravity.

In step 4, a three-dimensional mathematical model of the human urological organ system is constructed. Such a model optionally and preferably features a plurality of paths, as the urological organ system represents a complex anatomical structure. As previously described, this anatomical structure has three different paths, which are preferably incorporated into the mathematical model: each ureter and the bladder itself, all of which are connected to the urethra as the entry structure. Thus, the mathematical model for the urological organ system is preferably branched, such that the endoscope and guidewire may optionally be threaded along any of the branches.

Unfortunately, the endoscope itself is most easily modeled by a single path mathematical model. The location of the virtual tip of the endoscope is preferably determined according to the amount of the endoscope which has been inserted into the urological organ system, and the angle of the virtual tip, as more preferably measured by a six degrees of freedom (6 DOF) sensor. Thus, the movement of the endoscope is most limited to a single path through a single anatomical structure.

In order to overcome this limitation, the mathematical model preferably features a plurality of paths, which are automatically switched according to the movement of the simulated endoscope through the simulated urological organ system. The three-dimensional mathematical model of the urological organ system which is particularly preferred for the present invention is a polygonal model such as a spline. This mathematical function represents the urological organ system as a series of curves, such that the points in the three-dimensional structure of each portion of the urological organ system are mapped to the spline. For example, the urethra and each ureter could be modeled as a straight line which is deformed by altering the spline for the model until the model fits the data. The bladder is preferably modeled as a plurality of splines, in order to define the three-dimensional open volume of the bladder. Alternatively, the spline could be placed inside each portion of the urological organ system, and then mapped to that portion of the organ system. Preferably, multiple splines are used to model the junction of the urethra and bladder, for example.

The mapping can be performed according to three-dimensional coordinates, along the x, y and z axes. Alternatively, the mapping can be performed according to coordinates of time, angle and radius within each portion of the urological organ system. A mixture of these two different types of coordinates is also optionally employed, in which the coordinates are time, x and y for example. Both the spline itself and the mapping from the spline to the organ system can be altered in order to provide new and different visual representations of each portion of the organ system, for example in order to provide a plurality of theoretical "test cases" for students to study. The alteration is optionally performed according to MRI (magnetic resonance imaging) data, for example. In addition, optionally and preferably data from MRI and/or CAT scan procedures, and/or fluoroscopic procedures for diagnostic radiology, are cleaned and reassembled according to the mathematical model, in order to more accurately determine the geometry of the simulated urological organ system. Thus, the preferred mathematical model of the present invention permits the data to be rapidly visually rendered onto the model of the urological organ system.

The method of visually rendering the urological organ system according to the present invention includes a number of steps, described below, which are performed as software instructions operated by a data processor. The method preferably includes the step (shown as step 5 in FIG. 3A) of dividing the urological organ system into a plurality of portions. The division is made linearly, since the spatial movement of the simulated endoscope is limited. In other words, the simulated endoscope cannot "jump" from one portion of the organ system to another, but must instead proceed in a linear fashion along the simulated urological organ system. In addition, the simulated endoscope can only be moved at a finite speed through the simulated organ system. Thus, the endoscope must pass through each segment of the three-dimensional model of the organ system in sequence at a known, limited speed.

The consequences of such a division is that only one segment needs to be processed in any given moment, although a plurality of such segments could be processed substantially simultaneously if the computing resources were available. Furthermore, the division reduces the visual processing into a much more manageable task, since this model may optionally include thousands of polygons in the preferred embodiment, although each segment has far fewer polygons.

In addition, preferably only those portions which are in the line of sight of the camera, and hence either immediately visible or soon to become visible, are selected for visual rendering in order to decrease the computations required for the rendering. More preferably, the number of portions which are rendered is not predetermined, since under certain circumstances, the number of portions in the line of sight may vary. For example, when the camera is traveling around a bend in the organ system, the line of sight of the camera is very short, such that relatively fewer portions, or else smaller such portions, must be rendered.

It should be noted that an exception to the prohibition against "jumping" between portions of the urological organ system is the movement of the tip of the endoscope between different paths, or branches, of the organ system. As previously described, the urological organ system has a common entry structure, the urethra. The endoscope can then optionally travel along any one of three different paths: each ureter and the upper portion of the bladder volume. Thus, the procedure of segmentation also optionally and more preferably includes the step of determining through which of the three different branched paths the endoscope is moving, or whether the endoscope is within the entry structure of the urological organ system.

According to a further preferred embodiment of the present invention, as described in further detail with regard to FIG. 5 below, the physical simulation of the urological organ system optionally features a plurality of switching objects at the junction of each path. For example, preferably at least one such switching object is located at the junction of the bladder opening with each ureter. As the tip of the simulated endoscope and/or guidewire touches each such object, the mathematical model is preferably switched to the appropriate path for that portion of the urological organ system. Thus, the physical simulation of the organ system is preferably linked to the mathematical model.

Next, in step 6, the visual attributes of the area of the organ system being scanned by the camera are determined. Preferably, these visual attributes are determined according to a number of factors, including the location of the tip of the endoscope, which holds the camera, and the direction in which the camera itself is pointed. Other important factors include the shape of the organ system being modeled and the history of movement of the camera through the organ system. With regard to the latter factor, the previous movements of the endoscope through the organ system, as determined by the actions of the student, have a significant impact on the area of the organ system which is visualized by the camera at any given moment.

In step 7, preferably a local deformation to at least one of these portions is analyzed to determine if such a deformation affects the spline itself The mapped coordinates are then rapidly transformed from time, angle and radius to x, y and z. Next, in step 8 preferably the local deformation of the tissue of the organ system is determined through interpolation of the radius, in order to determine the degree of such deformation. Since the time, angle and radius may not give sufficient information to perform this calculation, optionally and preferably, the volume of the organ system is additionally altered according to predefined mathematical models.

For deformations on a highly local scale, such as the point of contact between the tip of the endoscopic instrument and the organ system at a low degree of force from the instrument, preferably the level of details in the area is increased by adding more polygons to the calculations performed with the model in order to be able to stretch all or substantially points in the immediate area without distortion. The stretching is preferably performed according to a predetermined function which preferably enables the spline model to be altered locally.

This preferred method for modeling "stretching" of the organ system can also be used to model local areas of irregularity such as a bladder tumor for example. Tumors can be mapped point by point onto the model of the bladder portion of the organ system, thereby adjusting the visual representation of the tissue to accommodate both the tumor itself and the structural alterations of the tissue at the base of the tumor.

Next, in step 9, the various types of data which were previously described are used to actually render the visual data onto the organ system. Initially, the mapping of such data onto the model optionally and preferably involves some adjustments, performed manually by a software programmer. Alternatively, such mapping could be entirely automatically performed.

In step 10, texture mapping from the database is overlaid onto the chunk of the model. Preferably, such texture mapping includes both the digitized images and additional animation. In step 11, the resultant images are displayed. As noted previously, the images are displayed in a continuous flow according to the location of the simulated endoscope within the simulated urological organ system. Also as noted previously, such mapping of coordinates is preferably performed according to the mathematical model of the organ system, which more preferably includes at least one, and most preferably a plurality of, splines.

FIG. 3B shows the visual processing and display system according to the present invention in more detail. A visual processing and display system 40 includes screen display 22 for displaying the processed visual data. The visual data are constructed as follows. First, data are recorded from actual urological endoscopy procedures onto videotape, as shown in a recording block 42. The data are preferably stored on Super-VHF videotape in order to obtain the highest quality representation of the visual images displayed on the screen during the actual endoscopic procedure, as shown in block 44. Next, at least a portion of the frames of the videotape, and preferably substantially all the frames, are abstracted individually by a frame-grabber 46 to form digitized images. Individual digitized images can then be selected for clarity and lack of artifacts such as reflections from the endoscopic apparatus itself The images in the selected frames are then preferably enhanced and added to a texture mapping database 48.

Preferably, two types of texture mapping are stored in the database. The first type of texture mapping is intended to enhance the realistic visual aspects of the images, for example by removing visual artifacts. The second type of texture mapping is intended to simulate the behavior of a live organ system and a real endoscope, as represented by block 50. During actual endoscopic procedures on a living human patient, the tissue of the organ system moves somewhat, and the endoscope itself vibrates and wobbles. The movement is particularly marked for the portion of the ureter which crosses the illiac vessel, and which moves at the rate of the beating heart, as previously described. This movement is simulated visually by the addition of animation of the images, whether random or directed, as for the ureteral movement caused by the pulsed flow of blood through the illiac vessel. Other types of movement may optionally be simulated by the addition of such effects as liquid flowing downward due to the influence of gravity. Such animation enhances the realistic nature of the visual representation of the organ system.

In order for the enhanced images to be correctly displayed, the images must correspond to the manipulation and location of the simulated endoscope within the simulated organ system. In particular, the texture mapping of the images should correspond to the location of the endoscope within the organ system. Such correspondence between the location of the endoscope within the organ system and the texture mapping is provided by a texture mapping engine 52. The texture mapping data is then readily accessed by the display portion of visual system 40, as shown by block 54.

However, as noted for previous prior art devices, simply reproducing the selected enhanced frames in a massive video stream would quickly overwhelm the computational resources and cause the visual display to become unsynchronized from the physical location of the simulated endoscope. Furthermore, such a video stream would not enable the correct display of images according to the movement of the endoscope, which preferably has six degrees of freedom. Thus, mere reproduction is not sufficient to ensure realistic images, even when mapped onto a three-dimensional surface.

Preferably, visual processing and display system 40 includes a three-dimensional mathematical model of at least a portion of the urological organ system 56, more preferably constructed as described in FIG. 3A. For the purposes of discussion, model 56 is herein described as a three-dimensional model of the organ system, it being understood that this is not meant to be limiting in any way. Model 56 preferably features a plurality of segments 58, more preferably many such segments 58, and a plurality of paths 59.

As the simulated endoscope moves along the simulated organ system, the location of the endoscope is given to a locator 60, described in further detail below. Locator 60 then instructs an object loader 62 to load the relevant segment 58 for access by visual system 40, as shown in block 54 and previously described. In the preferred embodiment shown, preferably three segments 58 of a particular path 59, and/or of a junction between paths 59, are ready for access by object loader 62 at any given moment. The specific segment 58 and/or path 59 in which the endoscope is currently located is preferably held in DRAM or RAM, in combination with the texture mapping described previously. The next segment 58 and the preceding segment 58 preferably are also stored in an easily accessible location, although not necessarily in RAM or DRAM.

Preferably, the display of each image from specific segment 58 into which the simulated endoscope has entered is optimized by a segment optimizer 64. Segment optimizer 64 receives information from locator 60, as well as the series of images obtained from overlaying the texture mapping onto the relevant segment 58, and then feeds each specific image to a display manager 66 for display on screen display 22.

In addition, display manager 66 is assisted by a real-time viewer 68, preferably implemented in Direct 3D™ (Microsoft Corp., USA). Real-time viewer 68 provides the necessary software support to communicate with a graphics card 70 for actual display of the images on screen display 22. Although graphics card 70 can be of any suitable manufacture, preferably graphics card 70 has at least 8, and more preferably at least 16, Mb of VRAM for optimal performance. An example of a suitable graphics card 70 is the 3Dfx Voodoo Rush™ card. Preferably, the performance of real-time viewer 68 is enhanced by a math optimizer 72, preferably implemented in Visual C++.

The interaction between segment optimizer 64 and display manager 66 on the one hand, and locator 60 on the other, is provided through a software interface 74, preferably implemented as a Direct Plug-in™ (Microsoft Corp., USA). Software interface 74 enables locator 60 to communicate with the other components of visual system 40, in order to provide information regarding the location of the endoscope within the organ system.

In preferred embodiments of the present invention, locator 60 includes a sensor 76, which can be obtained from Ascension Technology Corp., for example. Sensor 76 senses positional information from within a simulated organ 77. Sensor 76 is controlled by a control unit 82.

In addition, optionally and preferably, sensor 76 contacts a switching object 83 at each junction between different sections of simulated organ 77, for example between a ureter 85 and a bladder 87. When sensor 76 contacts such a switching object 83, this information is preferably sent to locator 60. Locator 60 then preferably instructs segment optimizer 64 to load the correct path and/or segment. Object loader 62 then optionally and preferably loads the correct image(s) for that particular path.

Visual system 40 also includes a user interface 84, preferably implemented in Visual C++. User interface 84 includes the GUI features described previously for FIG. 2. In addition, user interface 84 enables visual system 40 to interact with the preferred feature of a network interface 86, for example, so that other students can view screen display 22 over a network. User interface 84 also permits the tutorial functions of at least one, and preferably a plurality of, tutorial modules 88 to be activated. Tutorial module 88 could include a particular scenario, such as a subject with bladder cancer, so that different types of diagnostic and medical challenges could be presented to the student. The student would then need to respond correctly to the presented scenario.

Figure 4:
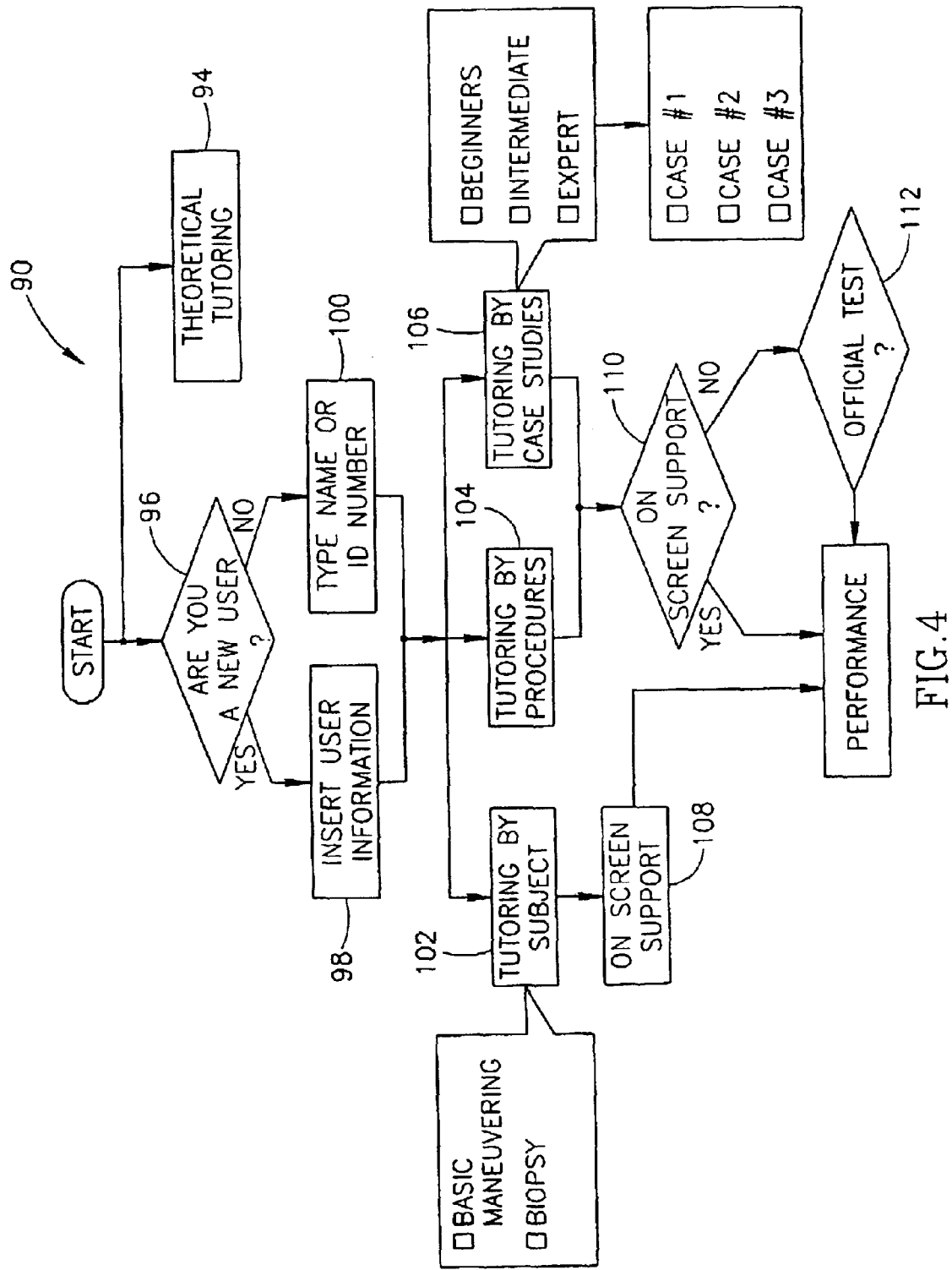
FIG. 4 is a schematic block diagram of an exemplary tutorial system according to the present invention.

An example of the tutorial system is illustrated in more detail in the block diagram of FIG. 4. A tutorial system 90 starts as shown in block 92. Next, the user must select whether actual interaction with the simulated endoscope is desired, or if the user prefers to receive tutoring in the theory of endoscopy, as shown in a block 94. The next display asks if the user is new, as shown in a block 96. If the answer is "yes", the user is requested to enter certain information, as shown by block 98. If the answer is "no", the user is requested to enter identification information, such as user name or identification number, as shown in block 100.

Next, the user must select the type of tutoring. For example, the user could select tutoring by subject 102, tutoring by procedures 104 or tutoring by case studies 106. Tutoring by subject 102 includes, but is not limited to, such subjects as basic manipulation of the endoscope, biopsy and tumor removal. Tutoring by subject 102 includes on-screen support, as shown in block 108.

Tutoring by case studies 106 can be selected both according to case number and according to the level of the desired cases, such as beginner, intermediate and expert. Preferably, individual case studies could be created by a teacher or professor, by combining features of various stored cases. For example, a professor could create a case history appropriate for a 50 year old male with bladder cancer, so that the student would then be able to practice endoscopy on such a patient. Thus, tutoring system 90 preferably has the flexibility to enable many different types of "patients" to be studied.

If desired, on-screen support can be provided for both tutoring by case studies 106 and tutoring by procedures 104, as shown in block 110. If on-screen support is not desired, the user can indicate whether the tutoring session is actually an official test, as shown in block 112. Thus, tutoring system 90 includes both the ability to teach and the ability to test the student.

According to a preferred embodiment of the present invention, the tutorial system also includes a simplified version of the simulated endoscopic process for teaching the proper manipulation of the endoscope according to visual feedback, as well as for enabling the student to understand the correspondence between the visual feedback and tactile feedback. This simplified version would emphasize the performance and mastery of one or more specific tasks, such as the manipulation of the endoscope through the organ system.

Indeed, this preferred embodiment could be generalized to a method for teaching a particular skill required for performance of an actual medical procedure to a student. This method would include the step of abstracting a portion of the visual feedback of the actual medical procedure, which would preferably include fewer visual details than the entirety of the visual feedback obtained during the performance of the medical procedure. This portion of the visual feedback would preferably enable the student to learn the motion of the instrument as the required skill.

For example, the simplified version may optionally not feature many, or even most, of the visual details of the organ system as visual feedback. Instead, the organ system would preferably be presented as a smooth, relatively featureless tube having the geometry, dimensions and overall branched structure of the organ system in order to correlate the motion of the simulated endoscope through the interior space of the organ system. More preferably, the simplified version would be embodied as a game, in which students would be awarded points for correct manipulation of the endoscope, and would be penalized for incorrect manipulations. Thus, the student would have the opportunity to learn the manipulations required for successful endoscopy without the distraction of visual details, in a low pressure and even "fun" environment.

Figure 5:
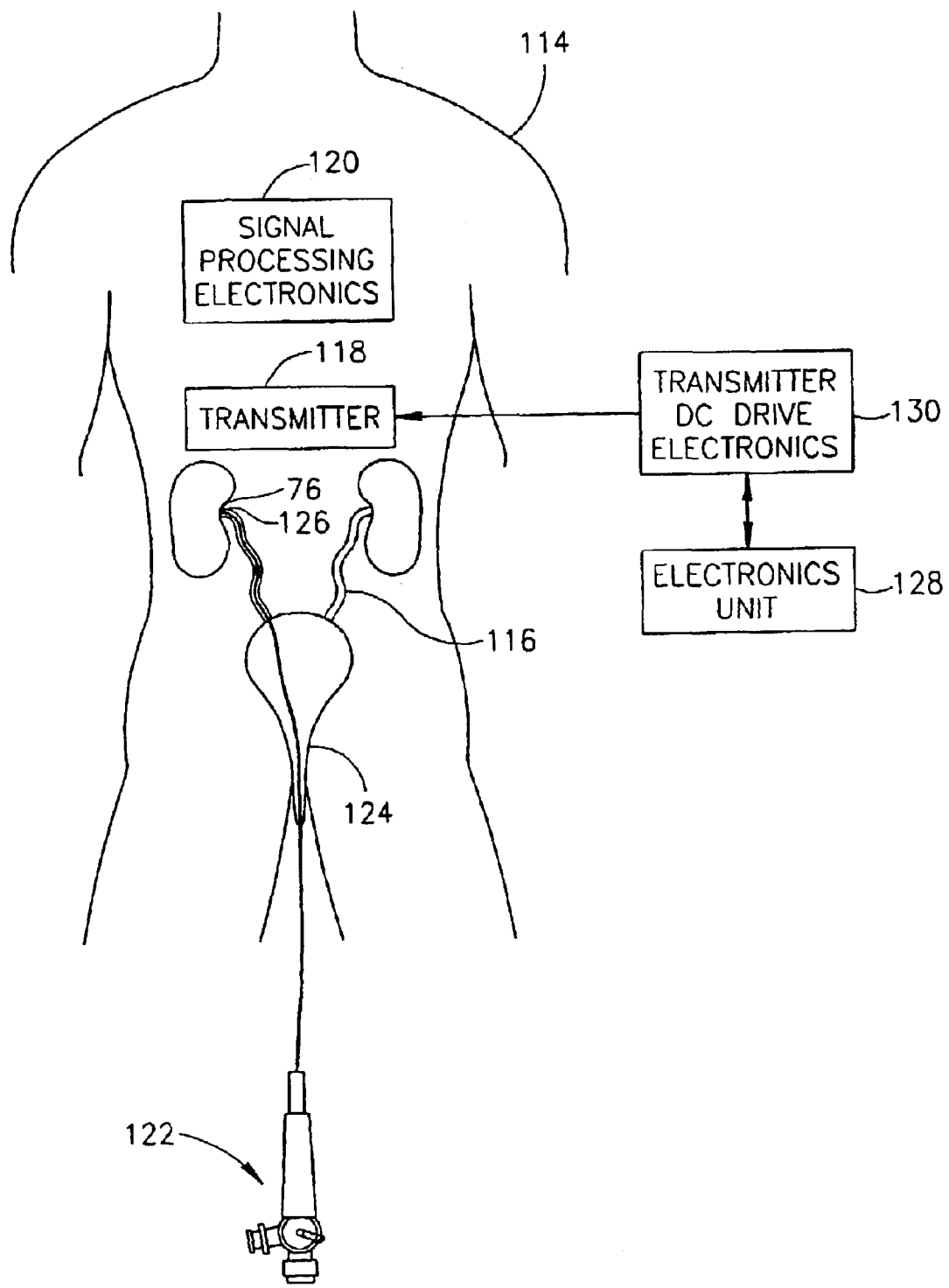
FIG. 5 illustrates an exemplary simulated urological organ system according to the present invention.

FIG. 5 illustrates the mechanical aspects of an exemplary simulated urological organ system according to the present invention. A cut-away view of a mannequin 114 is shown in FIG. 5. Preferably, mannequin 114 is about one meter wide, which is within the dimensions of an actual human subject. A simulated urological organ system 116 is shown within mannequin 114. Simulated urological organ system 116 is connected to a transmitter 118 and a signal processing device 120, also placed within mannequin 114. As shown, a simulated endoscope 122 can be inserted into mannequin 114 through an opening 124. In this case, since the simulation is for endoscopy of the urological organ system of the subject, opening 124 simulates the urethra of the subject.

Simulated endoscope 122 can optionally be maneuvered left, right, up and down. Preferably, simulated endoscope 122 is about 1800 cm long, similar to the length of a real endoscope. Also preferably, the diameter of the tip of simulated endoscope 122 is about 13.4 mm, while the remainder of endoscope 122 has a diameter of about 10.2 mm, again similar to the dimensions of a real endoscope.

Once simulated endoscope 122 is inserted into simulated urological organ system 116, sensor 76 on the tip of simulated endoscope 122 is able to detect the location of simulated endoscope 122. Sensor 76 preferably has three degrees of freedom, more preferably six degrees of freedom for effective simulation of manipulation of simulated endoscope 122. If sensor 76 has six degrees of freedom, the detected directions of orientation include the Cartesian coordinates X, Y, Z, as well as roll, elevation and azimuth. In addition, sensor 76 preferably includes a sensor transmitter 126, so that the precise angle and location of sensor 76 can be determined relative to urological organ system 116. Sensor transmitter 126 transmits data to signal processing device 120, which then analyzes and processes the signal. The processed signal is then given to transmitter 118 for transmission to an electronics unit 128 and a DC drive unit 130. The signal is converted by DC drive unit 130 and passed to electronics unit 128. Electronics unit 128 then sends the position and orientation of sensor 76 to software interface 74, so that the remainder of the display system is able to use the information to display the correct images on display screen 22 for visual feedback.

Figure 6:
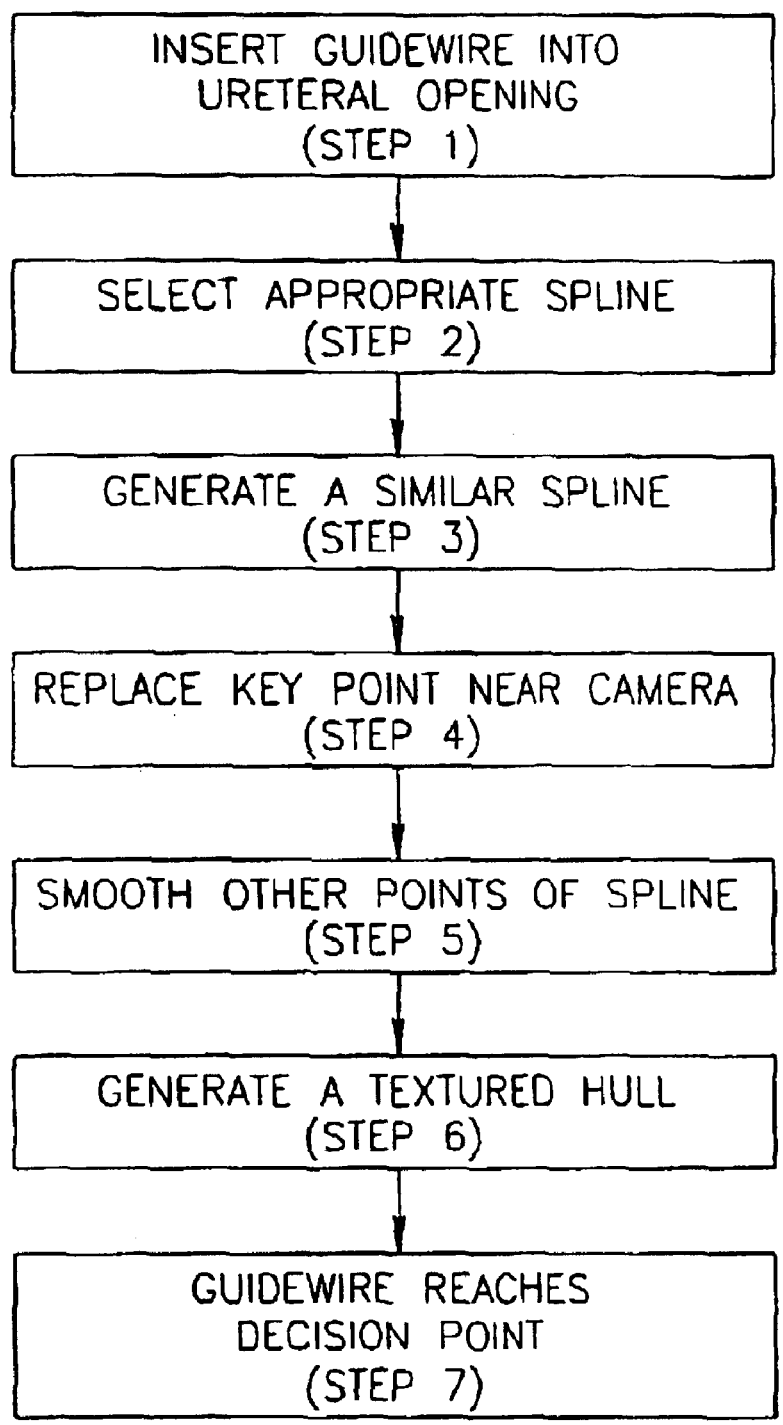
FIG. 6 is a flowchart of an exemplary but preferred method according to the present invention for simulating the operation of a guidewire within the urological organ system.

FIG. 6 is a flowchart of an exemplary but preferred method according to the present invention for simulating the operation of a guidewire within the urological organ system, as a separate but complementary portion of the endoscopic procedure. As previously described, before the endoscope itself can be inserted into the urethra, the guidewire must be inserted and navigated up to the endpoint of the path which is to undergo the endoscopic procedure, such as one of the kidneys for example. The guidewire then remains in place for the endoscope, and must thus be modeled separately from the actual endoscope itself.

In step 1, the guidewire is inserted into the ureteral opening. The guidewire typically includes a camera, which is also simulated in the present invention, such that images are returned from the movement of the guidewire within the urological organ system.

In step 2, an appropriate spline is selected for the initial entry structure of the urological organ system, preferably modeled as previously described. More preferably, as each junction point is passed, a plurality of splines is used to model the organ system at such a point. More preferably, the selection procedure includes the step of performing a minimization procedure for choosing the closest spline to the guidewire in terms of Euclidean distance from the lumen to the camera, and the angle of the camera.

In step 3, a similar spline to the selected spline is generated. Preferably, most of the spline keys for the generated spline are similar or identical to the chosen spline, except for the key point nearest to the camera.

In step 4, the key point nearest to the camera is preferably replaced by a point which is attached to the camera by a specified offset. This specified offset is the position on the endoscope from which the guidewire exits.

In step 5, the other points of the spline are then smoothed. Random noise is more preferably added to the three-dimensional position of these points. In step 6, the new generated spline is then used to generate a textured hull or shell around the three-dimensional position of these points.

In step 7, the guidewire reaches a decision point within the simulated organ system, at which point one of the three possible paths is preferably selected. As previously described, each such path is more preferably modeled by a separate spline or set of splines. Thus, once a particular path has been selected, the corresponding mathematical model is also selected.

At any point during the simulation, and more preferably at every point along the simulated organ system, the end point of the guidewire is optionally examined for possible contact with the portion of the organ system through which the guidewire is moving. If the guidewire has been found to contact the tissue, such as the back of the kidney for example, then the guidewire either stops or loops around itself. Looping of the guidewire is optionally and preferably modeled with a plurality of splines, such that the dimensions of the loop are more preferably determined according to the dimensions of the portion of the organ system, the deformability of that portion, and the amount of the guidewire which has been inserted into the organ system. If contact is maintained and/or is performed with sufficient force, then the guidewire may perforate the organ, which is then simulated by the present invention.

Figure 7:
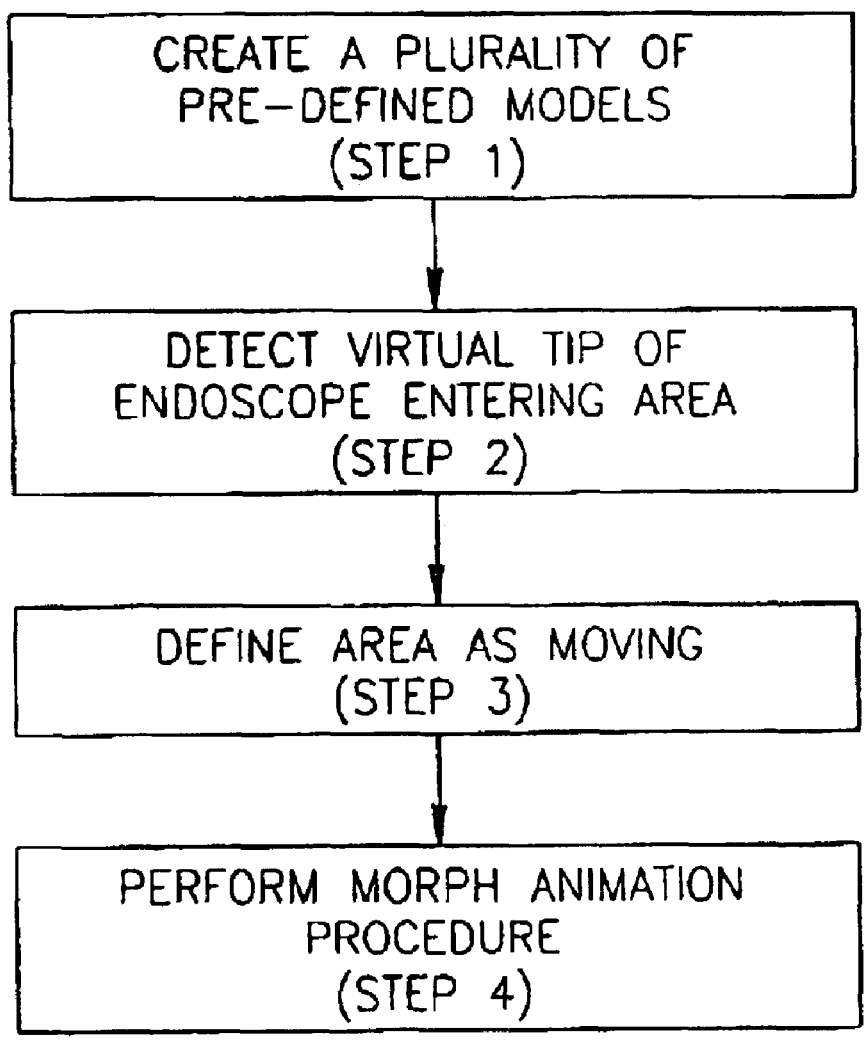
FIG. 7 is a flowchart of an exemplary method for simulating pulsed movement within a lumen according to the present invention.

FIG. 7 is a flowchart of an exemplary method for simulating pulsed movement within a lumen according to the present invention. One example of such pulsed movement within the urological organ system occurs at the point where the ureter crosses the illiac vessel. The illiac vessel pulsates at the rate of the beating heart, which pushes blood through the illiac vessel under pressure. The pulsation of the illiac vessel in turn causes the ureter to move from side to side at the rate of the beating heart. If the ureter contains at least a portion of the endoscope, then the endoscope also moves with the ureter. Such movement of the endoscope must be simulated.

A flowchart of an exemplary method for simulating such movement of the endoscope according to the present invention is shown in FIG. 7. In step 1, preferably a plurality of pre-defined mathematical models of the ureter is created. The plurality of models describes each possible position of the ureter as it moves. More preferably, three such mathematical models are created.

In step 2, the virtual tip of the endoscope is detected as entering the area in which the ureter is affected by the illiac vessel. In step 3, an area of the ureter is defined as moving, preferably according to the segment model previously described above.

In step 4, a morph animation procedure is optionally and more preferably performed to simulate the effect of the pulsation of blood through the illiac vessel on the ureter, and hence on the endoscope. Such a morph animation procedure most preferably includes the steps of simultaneously morphing all the vertices of the appropriate models which describe the visual appearance of the ureter in that area. Most preferably, the area is defined as a segment of the ureter. Such simultaneous morphing is preferably performed at an appropriate speed, in order to correctly simulate movement.

In order to correctly define the appropriate speed of morphing, and hence of apparent movement, preferably each vertex is assigned a velocity and a direction of movement. The vertex is then defined as moving from one rendered image to the next according to the assigned velocity and direction of movement.

Figure 8:
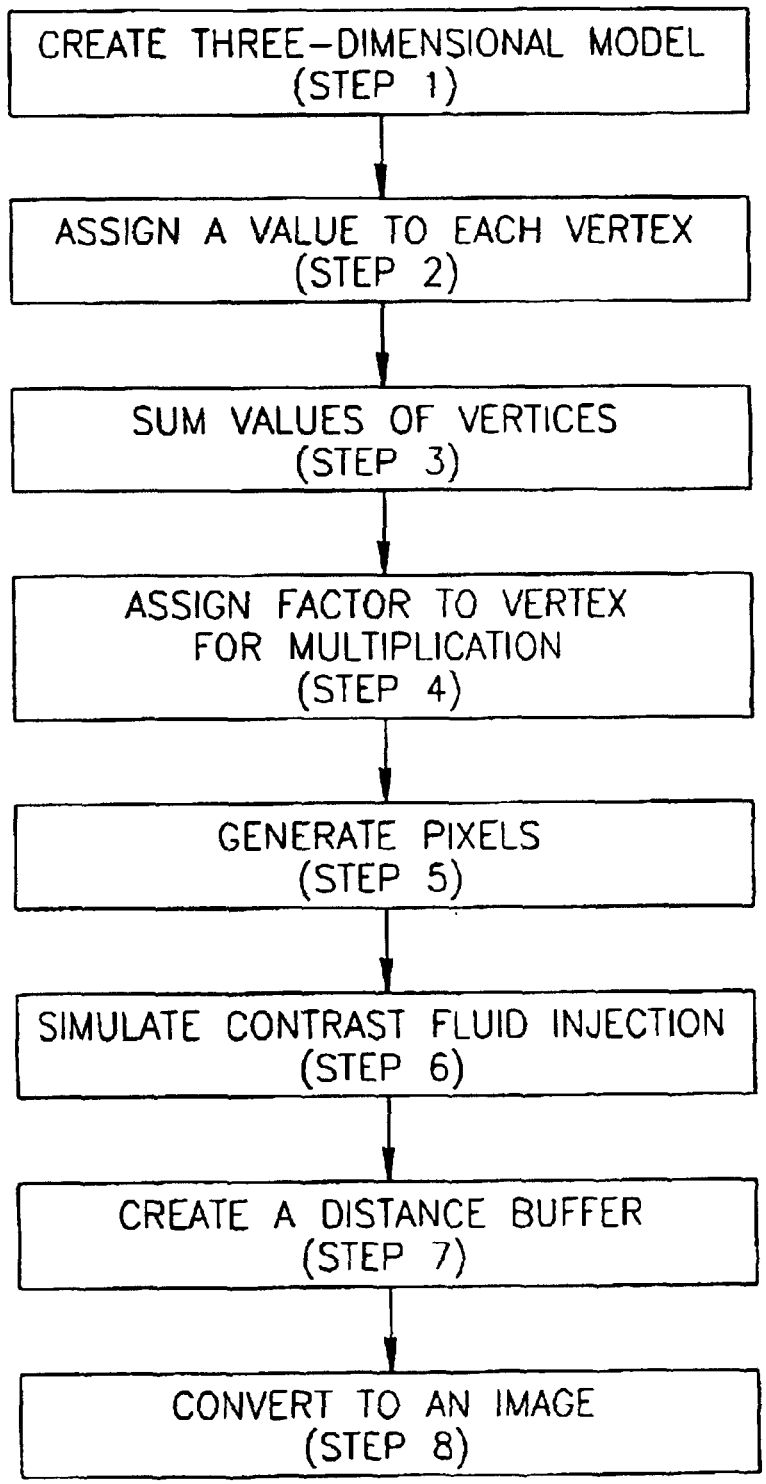
FIG. 8 is a flowchart of an exemplary method for simulating a fluoroscopic procedure for diagnostic radiology within the urological organ system according to the present invention.

FIG. 8 is a flowchart of an exemplary method for simulating a fluoroscopic procedure for diagnostic radiology within the urological organ system according to the present invention. Fluoroscopy involves the transmission of a beam of penetrating radiation through at least a portion of the body, in order to receive an image of the internal organ(s) in motion for viewing on the monitor screen. The contrast between portions of the body, such as the internal organs, in medical X-ray photographs (radiographs) is produced by the differential scattering and/or absorption of X-ray radiation by bones and tissues. Such contrast is further heightened by the use of contrast dyes, which are injected at or near the appropriate organ(s) to be visualized. The effect of visualization of at least a portion of the urological organ system on the displayed images of the endoscope is preferably simulated according to the exemplary method which is described with regard to FIG. 8.

As shown, in step 1, a three-dimensional model of at least a portion of the urological organ system is created, for example as previously described. Preferably, the model includes a plurality of vertices with edges connecting these vertices. Each triplet of edges forms a triangle.

In step 2, each vertex of each triangle is assigned a value which corresponds to the distance of the vertex from the virtual camera and/or tip of the virtual endoscope. The sign, whether positive or negative, is determined by the normal of the triangle. If the triangle faces the camera, then the sign is positive. If the triangle faces away from the camera, then the sign is negative.

In step 3, pixels are generated by summing the values of the three vertices. Steps 2 and 3 are a variation of a method which is known in the art as "gouraud shading" (see for example http://library.thinkquest.org/10300/enhanced_pages/3d/gouraud.html). The final result for the generated pixels depends on the width of each body organ.

In step 4, preferably each vertex is also assigned a factor by which it is multiplied, which represents the density of the organ. In step 5, the pixels are then generated.

In step 6, to simulate a contrast fluid injection, which is a comparatively opaque liquid for X-ray radiation, the factors for each vertex are optionally and preferably modified continuously in real time. More preferably, such modification is performed both from the direction of the injection and from inside the organ(s). Most preferably, various parameters are adjusted to control for the amount of injected contrast fluid, the speed of movement of the fluid and the factors for each vertex. Other factors which are optionally and most preferably determined according to the opacity of an object to X-ray radiation. The contrast factor is determined according to the opacity of an object to X-ray radiation. However, since the present invention preferably employs surface models for simulation of the urological organ system, the depth of the object is most preferably calculated according to the simulated surface.

An exemplary method for calculating the depth of the object for a contrast fluid injection according to the present invention is described with regard to step 7 of FIG. 8. The method optionally and preferably includes the steps of first creating a two-dimensional memory buffer. This buffer more preferably has the width and height of the screen buffer used for rendering the image, such that each "pixel" of the buffer is actually a real number. The value of the pixels is then set to zero.

Next, the distance is calculated of each vertex of the surface of the urological organ system, or the portion being rendered thereof, from the emission point of X-ray radiation. The previously described triangular faces are then rendered with the gouraud shading method, but with distance as the interpolated value as previously described. Rendering of the faces is performed differently for those faces which are "facing" the emission point of X-ray radiation, than for those faces which are not. The former are rendered with a negative distance, while the latter are rendered with a positive distance.

Each such distance is multiplied by the contrast factor before the shading process is performed. Then, shading is performed by filling a buffer of distances with the interpolated values of each face. Next, the resultant buffer is used for rendering. The buffer contains delta distances of the urological organ system from the emission point of radiation, multiplied by the correct contrast factor.

The distance buffer must then be converted to an image, as described with regard to step 8 of FIG. 8. The distance buffer contains values representing distance, while the required values are those of color. Therefore, preferably the values for the distances are converted to color using a pre-calculated table of values. This table assumes that the exponent of the distance is the value for the reflection of the X-ray radiation at that point, such that the exponent multiplied by the contrast factor, assuming homogeneity, is the amount of X-ray radiation which is blocked. Therefore, the table is used to convert directly from linear distance to the required color, resulting in a black and white (grayscale) image similar to that which would be produced with an actual X-ray machine.

According to optional but preferred embodiments of the present invention, the medical procedure which is simulated includes Percutaneous Nephrolithotomy (PCNL). PCNL is a complex procedure consisting of 3 main phases. The first and most important phase is the actual puncture of the kidney. The surgeon introduces a needle, entering from the patient's back, directly into a selected calyx in the kidney, aided by fluoroscopy. Next, in the second phase, the needle is removed, leaving in place a small metal channel which leads to the kidney. A guidewire is then placed into this channel. Dilators are used over this guidewire . Dilators can optionally be either a balloon or a set of graduated catheters (the latter is termed the "amplatz set"). The balloon is placed over the guidewire and inflated. The inflation of the balloon creates a wide opening for the cannula sheath to enter. The catheters of the set of graduated catheters have several different diameters. The surgeon starts by pushing the very thin catheter onto the guidewire and waits a few seconds. The surgeon then removes this catheter and moves to the next largest catheter in terms of diameter, until the opening is wide enough for a 10 mm plastic sheath, or any other type of sheath through which the endoscope can enter.

Then, in the third phase, the actual endoscope is introduced into the kidney, preferably as a rigid nephroscope or flexible cystoscope, which is introduced via the sheath into the kidney. This endoscope is then used to treat the kidney stone or other pathology.

The rigid nephroscope provides a wide working channel, through which various tools can be introduced, particularly large diameter rigid tools such as lithotripter devices for applying different types of energy for breaking kidney stones and other types of solid matter in the urological organ system, including but not limited to ultrasound lithotripters, Lithoclast (pneumatic) devices, or laser or EHL (electrohydraulic energy) lithotripters; forceps, baskets and other devices, for comfortably performing the lithotripsy. Flexible scopes can optionally be used to introduce lasers and baskets into the kidney, as tools for performing the required procedure(s).

Returning now to the actual procedure, as described in more detail, the first stage involves puncturing first the skin of the patient, and then the kidney. PA (Percutaneous Access) is always performed under fluoroscopy. The patient is pre-catheterized and lying on the stomach area (prone position), with a body slant around the backbone axis to provide the best access to the kidney. Contrast agent is optionally injected through a urethral catheter and dyes the ureter and kidney. After choosing the desired destination calyx, the surgeon places a needle above the calyx,. which may optionally be performed at an angle, for example tilted away 90°.

The needle can then be advanced under fluoro-vision into the desired calyx. The puncture is preferably performed without changing the angle of the needle after penetrating the skin. If the needle misses the calyx, the needle is extracted and inserted again in a different place and/or angle.

When the needle is in place, there is usually a clear indication, as urine is spilling out of the tip of the needle. If not, or if the surgeon is not confident that the needle is in the proper position, the surgeon can optionally inject "blue water" through the urethral catheter and check to see that this colored water spills from the tip of the needle.

Next, in the second phase, the guide wire is placed and the opening is dilated. When the needle is in place, the inner part of the needle is removed and a wire guide is placed inside the needle sheath. The guidewire is usually directed down the ureter. The needle is then removed.

Next dilators, such as the amplatz set or the balloon as previously described, are placed on the guidewire, in order to dilate and create a path for the cannula sheath.

In the third phase, any necessary procedure(s) are performed in order to manipulate and/or treat the condition of kidney stones. Once the cannula is in place, rigid and/or flexible endoscopes can optionally be introduced into the kidney and the desired task performed, such as stone fragmentation and removal, treatment of obstructions in the renal pelvis or the upper ureter, etc. Rigid lithotripters are used most frequently for fragmentation, and rigid graspers are typically used for removal, of kidney stones.

According to the present invention, the above procedures are optionally and preferably simulated with the device of the present invention. More preferably, the simulator device according to the present invention is comprised of two separate areas, a first area for performing ureteroscopy and percutaneous lithotripsy, without punctures; and a second area for simulating punctures. These two separate areas may optionally be packaged as a single "add-on" module to the previously described system of the present invention, or may also optionally be contiguously formed with the previously described system.

Preferably, the puncture phase and procedure is simulated by using an actual puncturing needle 400, equipped with a 5x5 mm tracking sensor 410, preferably with 6 degrees-of-freedom, as shown with regard to FIG. 9. The wire guide that is used after puncturing is preferably simulated by using a tracking channel 420 and tracking wires (not shown) of the present invention, and is more preferably located on needle 400 and beside the puncturing area, with two wire guides for increased flexibility as shown in FIG. 10.

As shown with regard to FIG. 10A, a puncture unit 300 features a main body 310 for holding various components for simulating a procedure requiring entry to the urological organ system through a puncture. Main body 310 is optionally shaped like a mannequin or a portion of a human figure thereof Main body 310 features a puncture cavity 320 for receiving a needle and/or other devices, as previously described, for simulating tools required for performing the puncturing procedure. Puncture cavity 320 is preferably filled with a special material, which simulates the texture and "feel" of the patient's back. One non-limiting example of such material is a piece of foam latex, such as the McLaughlin FOAM (The Monster Makers, Cleveland, Ohio, USA.; see http://www.monstermakers.com/).

This type of material is preferred because it is similar in feel to the muscle and fat layers. This material has been tested with multiple punctures, and has been found to be sufficiently strong, without tearing, and seems to regain its shape when the needle is removed.

Optionally and most preferably, puncture cavity 320, or at least the material contained therein in which the punctures are performed is replaceable. The material in puncture cavity 320 is most preferably sufficiently thick to simulate the feel of a needle moving through the body tissues of the subject and to hold the needle in the exact angle in which it was introduced. Optionally, a cover 330 is placed over puncture cavity 320 when not in use, in order to protect this material from dust and general exposure.

In order to be able to further simulate the medical procedure, preferably two guidewires connected to main body 310 (not shown through two guidewire connectors 340 at a tool area 350 (shown in more detail in FIG. 10B). The guidewires can be inserted through connectors 340 into one of two tracking channels for tracking. A first tracking channel (not shown; see FIG. 11) is on the needle and a second tracking channel 360 is on main body 310.

Figure 11:
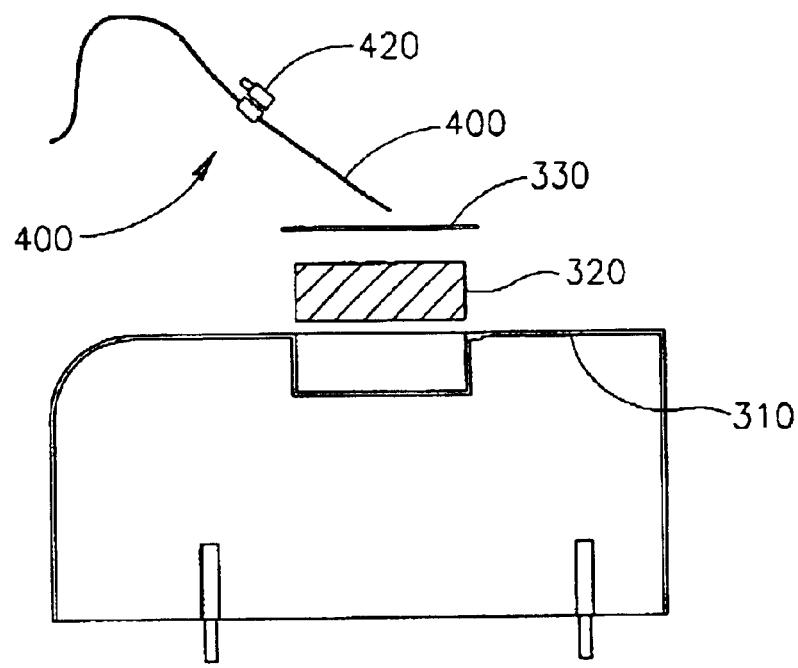
FIG. 11 shows an exemplary configuration of a puncturing cavity for simulating the performance of punctures according to the present invention.

An exemplary configuration of puncturing cavity 320 for simulating the performance of punctures is shown in FIG. 11 The numbering of the components for FIG. 11 is the same as for FIG. 10. As the wire is inserted in either of tracking channels 360 or 420, as shown in FIGS. 9, 10 and 11, the length of the inserted wire within either tracking channels 360 or 420 can be determined. Optionally and more preferably, such a determination is performed by attaching sensor 410, most preferably a six degrees of freedom sensor, to the upper side of needle 400. Since the overall length of needle 400 is known, and the position and orientation of sensor 410 at the back of needle 400 is also tracked, the exact position of the whole needle 400 can be calculated. The position of virtual needle in respect to the position of the kidney is set to match the position of the physical simulation needle 400 in main body 310, so every movement of needle 400 in main body 310 can optionally be seen in the virtual fluoroscopy immediately within the virtual kidney.

Next, the virtual wire entering the virtual kidney is simulated according to this distance measurement.

Figure 12:
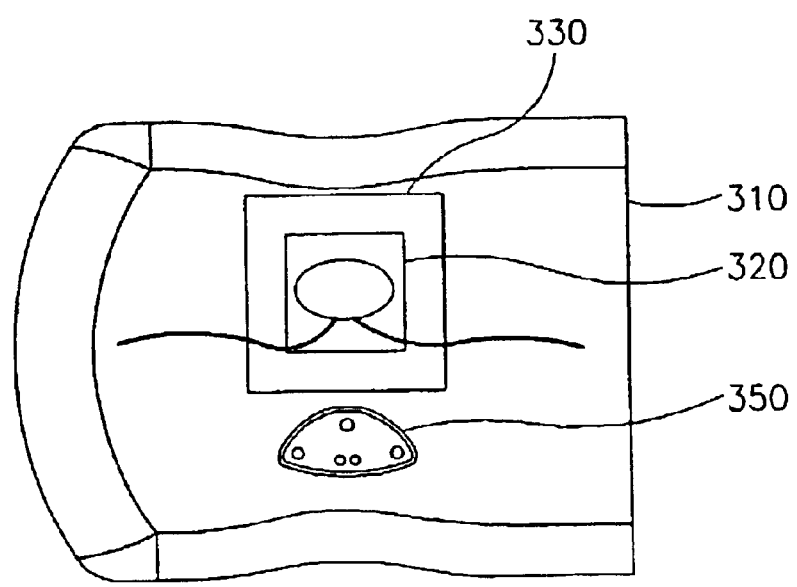
FIG. 12 shows an example of a virtual tracking and display according to the present invention.

The movement of needle 400 within the simulated subject is preferably displayed by a display screen in the fluorowindow. The kidney optionally and more preferably appears to be black due to the contrast medium, and the virtual needle is more preferably also visible, since it is tracked by the system. An example of such tracking and display is shown in FIG. 12, with a virtual kidney location display 405 shown as part of the simulated subject.

Once the needle is inside the chosen calyx, there is optionally and more preferably an indication on screen, such as a notification, color change, and so forth, indicating that the user has placed the needle correctly inside the calyx. The virtual kidney can optionally be a left or a right kidney, according to the case.

In the next phase, for guide wire placement, the guide wire must be inserted into the appropriate channel, preferably tracking channel 360. As shown, tracking channel is preferably located on or near puncture cavity 320, but alternatively is located on the needle. Tracking channel 360 preferably also includes proprietary torque tracking, so that the guide wire can optionally and more preferably be rotated as well as advanced. The rotation of the wire is tracked by two rotary dip switches that are installed inside the tracking channel itself When the wire is loose, no switch is pressed. When the wire is rotated to the left, switch#1 is pressed. When the wire is rotated to the right, switch#2 is pressed. The computer identifies those pressed and translates them to constant but limited to, rotation to the appropriate side.

The wire is preferably inserted into the ureter or to other calyxes, in a trial and error fashion. The difficulty of this process is optionally adjustable.

Next, for the third phase, stone manipulation and/or other procedures are optionally and preferably performed. For example, the user could optionally be required to perform a procedure with a rigid nephroscope or a flexible cystoscope, each tracked with a 6 DOF (six degrees of freedom) sensor, as for regular cystoscopy.

Tools which are optionally and preferably included within the present invention include, but are not limited to: guidewires; electrodes; baskets; forceps (both biopsy and stone extraction forceps); lithotripters; balloons; catheters; and stents.

Guidewires are used for two main purposes: safety, and assistance for endo-urologist to enter tools into the ureter. A guidewire is inserted in the working channel of the scope. The virtual guidewire of the present invention preferably behaves exactly like a real wire would for the actual medical procedure, with flexibility parameters, more flexible tip with variety of length, possible angled tip for easier insertion to the ureteral orifice, different diameters and different materials. All those real-life parameters are preferably implemented in the device of the present invention to simulate a true-to-life guidewire.

When the cystoscope is facing the ureteral orifice, a guidewire is pushed in the tracking channel and exist from the distal end of the scope. The endo-urologist then attempts to catheterize the orifice with the guidewire, and can see the tip of the wire through the optics of the scope as well as in the fluoroscopy view. Once a guidewire is entered into the ureter, the scope is extracted, leaving the wire in the system. A flexible or rigid ureteroscope is then inserted virtually on or by the guidewire. If the ureteroscope is on the guidewire, the ureteroscope is easily pushed into the ureter, since the wire is practically leading the way. If on the other hand, the ureteroscope is moving along side the wire, the wire will act as a safety guidewire. The insertion of the scope to the ureter is more difficult, but the virtual working channel would remain free and open for other tools.

Electrodes are another example of a tool which is included within the device of the present invention. In the actual medical procedure, electrodes are used for two purposes. One such purpose is for coagulation of bleeding areas and the other purpose is for cutting strictures in the ureter or the pelvic junction (UPJ).

The first feature is controlled by pressing the tool pedal when the electrode is touching the tissue, and enables surfaces of the bladder or other area in the urinary tract to be coagulated if bleeding occurs. During the actual medical procedure, and also during the simulated procedure as performed with the present invention, a white spot appears under the tip of the electrode and the bleeding stops immediately.

The other feature enables the endourologist to open strictures in the ureter. Once the electrode is activated when in contact with the stricture, the stricture is smoothly cut, leaving a clear path for the ureteroscope.

Baskets are used to grasp and extract stones or stone fragments from the urinary tract. There are a variety of baskets used in the market; the most popular and common are preferably implemented in the device of the present invention. The three most common types of baskets are: flat wire basket, helical basket and tipless baskets.

The flat wire basket holds stones better than others but is harder to grasp the stones with. The helical basket is designed for the retrieval of stones from bladder, ureteral and renal pelvic areas. It is smoother, and can be more easily used to grasp the stones, but the stones are more likely to fall out of the basket when the basket is rapidly removed. Those two baskets have a tip. The tip helps to keep the basket straight in the ureter and to push it in. The third type of basket is the tipless basket, and is used to grasp and remove the stones. It is used to remove stones in the kidney calyxes.

Forceps are also included for simulation of the medical procedure according to the present invention, including both biopsy and stone extraction forceps. Forceps are used mainly to extract stone fragments. Grasping with forceps is easy: once the stone is grasped by the forceps tooth, and the forceps are closed, the stone is usually grasped, unless it slips out or is too big for the forceps. The forceps is opened and closed using a real forceps handle connected to the computer for the purposes of simulation according to the present invention. The opening and closing of the tool forceps handle is tracked by the computer and translated to the opening and closing of the virtual forceps.

Another type of forceps is biopsy forceps. This type of forceps can remove a portion of the tissue with "jaws", leaving a small bleeding site, which should later be coagulated with the previously described electrodes for coagulation.

Lithotripters are also preferably provided as part of the simulation of the medical procedure by the present invention. For example, lasers are preferably featured as part of the present invention. Lasers are used for breaking stones as well as opening ureteral strictures and coagulation of bleeding spots. A variety of laser fibers can be inserted into the working channel of the scope and used.

The diameter of the laser is chosen according to the hardness of the targeted stone, flexibility of the scope, type of scope and size of its working channel. The simulator optionally and more preferably automatically prevents the insertion of the laser fiber, and well as any other tool, if the virtual working channel is full.

Once the real laser is inserted into the tracking channel during the simulation of the actual medical procedure, a laser control panel appears at the bottom of the screen. The laser parameters of frequency and Joule-per-pulse can preferably be modified via the control panel in order to control the performance of the laser fiber on the stone. The energy formula is: $W=F \times J$, where F is the frequency and J is Joule-per-pulse. The higher the energy, the easier and faster the stone breaks.

Lasers can be used for cutting stricture and for coagulation, just like electrodes. The energy for cutting strictures should be very high and the laser must be in contact with the stricture. Coagulation occurs if the laser beam is aimed at the tissue from a short distance and the energy is low. If on the other hand, the energy is high and the laser is too close (shorter than one millimeter) the laser may perforate the tissue, an eventuality which is also preferably simulated by the device of the present invention.

Other lithotripters, like lithoclast, EHL and ultrasound, are similar. At least one, but preferably all of these tools, are implemented in the device of the present invention according to the relevant literature.

Balloons are also preferably included within the present invention, and are used for stricture opening as well as dilation of the ureteral orifice and of the ureter. They are inserted on a guidewire optionally through the scope, and dilated when positioned in the chosen place, either in the ureteral orifice around a stricture.

Catheters are also preferably simulated by the present invention. A catheter is usually a graduated tube which is inserted through the working channel of the urethroscope and into the ureter. Catheters are used for dilation of the ureteral orifice and of the ureter, and for injection of contrast medium in to the ureter and kidney. They are similar in behavior to a rigid guidewire and are more easily inserted in to the ureteral orifice than a guidewire.

Stents are usually inserted into the ureter or urethra and left there for 48 hours to several weeks after the procedure ends in order to drain the urine and help the system heal after the procedure. Stents are introduced on the guidewire optionally through the scope. They are usually viewed fluoroscopically. All of these features are preferably included within the device of the present invention.

The puncturing phase can be performed separately with a stand-alone puncturing system. The system optionally and more preferably include the following components: a portable computer, a guide wire tracking system, sensor tracking system, a needle and a puncturing area.

It will be appreciated that the above descriptions are intended only to serve as examples, and that many other embodiments are possible within the spirit and the scope of the present invention.

What is claimed is:

1. A system for performing a simulated medical urological endoscopy procedure, comprising:
   (a) at least a portion of a simulated urological organ system;
   (b) a simulated endoscope for performing the simulated medical urological endoscopy procedure on said at least a portion of said simulated urological organ system;
   (c) a locator for determining a location of said simulated endoscope within said simulated at least a portion of a simulated urological organ system;
   (d) a visual processing and display system for displaying images according to said location of said simulated endoscope within said simulated at least a portion of a simulated urological organ system for providing visual feedback, such that said images simulate actual visual data received during an actual medical procedure as performed on an actual subject; and
   (e) a plurality of mathematical models for modeling said at least a portion of a simulated urological organ system according to a corresponding at least a portion of an actual urological organ system, wherein each mathematical model features a plurality of connected branched paths, each path being modeled with at least one spline, path corresponding to a branch of an actual urological organ system, wherein said paths comprise at least a first path for a bladder, two paths for ureters, connected to a spline for modeling a urethra as an entry structure, and wherein said visual processing and display system selects a mathematical model according to said location of said simulated endoscope and selects said images according to said mathematical model.

2. The system of claim 1, wherein said mathematical model is adjusted for each organ simulated in said simulated urological organ system.

3. The system of claim 1, wherein said bladder is modeled with a plurality of splines to define the three-dimensional open volume of said bladder.

4. The system of claim 1, wherein a tip of said simulated endoscope is modeled with a single path mathematical model, such that only one of said plurality of paths is selected for modeling said simulated urological organ system at any given time, said path being selected according to a location of said tip of said simulated endosoope within said simulated urological organ system.

5. The system of claim 4, wherein said location of said tip of said simulated endoscope within said simulated urological organ system is determined according to a sensor located on said tip of said simulated endoscope.

6. The system of claim 4, wherein each spline for modeling an organ is mapped to said simulated urological organ system according to one of three-dimensional coordinates and coordinates of time, angle and radius.

7. The system of claim 1, wherein said simulated urological organ system is divided into a plurality of linear segments, such that said linear segments are determined according to said location from said locator, and such that said display is determined according to said segment.

8. The system of claim 7, wherein only said segment is modeled with said mathematical model for determining said display.

9. The system of claim 7, wherein only a portion of said simulated urological organ system is modeled for determining said display if said portion is in a direct line of sight of said simulated endoscope.

10. The system of claim 1, wherein said visual display is at least partially determined according to a deformation in said simulated urological organ system.

11. The system of claim 10, wherein said deformation in said simulated urological organ system is at least one of a local deformation to said simulated urological organ system and a deformation to a spline for modeling said simulated urological organ system.

12. The system of claim 10, wherein said deformation is a local deformation and said deformation is visually rendered by adding geometric points to an area of said deformation.

13. The system of claim 1, wherein said visual display is also rendered by mapping visual data over said mathematical model.

14. The system of claim 13, wherein said visual data is obtained from at least one of video data from an actual medical procedure of endoscopy, MRI (magnetic resonance imaging) data, fluoroscopy data from diagnostic radiology and CAT (computer assisted tomography) data.

15. The system of claim 13, wherein said visual data is added to said mathematical model as texture mapping.

16. The system of claim 13, wherein said visual data further comprises animation.

17. The system of claim 13, wherein a local area of visual irregularity is rendered by mapping each point of said visual irregularity to said mathematical model for adjusting a visual representation of tissue at said simulated urological organ system according to said visual irregularity.

18. The system of claim 1, wherein said simulated endoscope further comprises a simulated guidewire.

19. The system of claim 18, wherein said simulated guidewire is modeled by a separate mathematical model from said simulated endoscope.

20. A system for performing a simulated medical urological endoscopy procedure, comprising:
   (a) at least a portion of a simulated urological organ system;
   (b) a simulated endoscope for performing the simulated medical urological endoscopy procedure on said at least a portion of said simulated urological organ system;
   (c) a locator for determining a location of said simulated endoscope within said simulated at least a portion of a simulated urological organ system;
   (d) a visual processing and display system for displaying images according to said location of said simulated endoscope within said simulated at least a portion of a simulated urological organ system for providing visual feedback, such that said images simulate actual visual data received during an actual medical procedure as performed on an actual subject; and
   (e) a plurality of mathematical models for modeling said at least a portion of a simulated urological organ system according to a corresponding at least a portion of an actual urological organ system, wherein each mathematical model features a said path, a said path corresponding to a branch of an actual urological organ system, and wherein said visual processing and display system select a mathematical model according to said location of said simulated endoscope and selects said images according to said mathematical model, and
   wherein a virtual switching object is present at a junction of any two branches of said simulated urological organ system such that if a tip of said simulated endoscope touches said switching object, said mathematical model is switched to said branch of said simulated urological organ system.

* * * * *